US011664942B2

(12) United States Patent
Chou et al.

(10) Patent No.: US 11,664,942 B2
(45) Date of Patent: *May 30, 2023

(54) METHOD FOR SIGNALING BANDWIDTH PART (BWP) INDICATORS AND RADIO COMMUNICATION EQUIPMENT USING THE SAME

(71) Applicant: 5G IP HOLDINGS LLC, Dallas, TX (US)

(72) Inventors: Chie-Ming Chou, Taipei (TW); Yung-Lan Tseng, Taipei (TW)

(73) Assignee: 5G IP Holdings LLC

( * ) Notice: Subject to any disclaimer, the term of this patent is extended or adjusted under 35 U.S.C. 154(b) by 0 days.

This patent is subject to a terminal disclaimer.

(21) Appl. No.: 17/085,484

(22) Filed: Oct. 30, 2020

(65) Prior Publication Data

US 2021/0050969 A1    Feb. 18, 2021

Related U.S. Application Data

(63) Continuation of application No. 15/855,105, filed on Dec. 27, 2017, now Pat. No. 10,868,649.

(Continued)

(51) Int. Cl.
*H04L 5/00* (2006.01)
*H04W 74/00* (2009.01)
(Continued)

(52) U.S. Cl.
CPC ............ *H04L 5/0042* (2013.01); *H04L 5/001* (2013.01); *H04W 72/042* (2013.01);
(Continued)

(58) Field of Classification Search
CPC .... H04L 5/0042; H04L 5/001; H04W 72/042; H04W 72/044; H04W 72/1268; H04W 74/006; H04W 16/10
See application file for complete search history.

(56) References Cited

U.S. PATENT DOCUMENTS 10,868,649 B2 * 12/2020 Chou ................ H04W 72/1268
2012/0251761 A1    10/2012 Hung et al.
(Continued)

FOREIGN PATENT DOCUMENTS

| CN | 101567714 A | 10/2009 |
| WO | 2009/131225 A1 | 10/2009 |
| WO | 2016/068072 A1 | 5/2016 |

OTHER PUBLICATIONS

LGE, R2-1713879, Summary of E-mail discussion on [99bis#43] [NR UP/MAC] Impact of BWP UP/MAC] Impact of BWP, 3GPP TSG RAN WG2 #100 (Nov. 17, 2017).
Samsung, R2-1704503, RAN2 impacts from bandwidth part in NR, 3Gpp TSG RAN WG2 #98, 3GPP (May 4, 2017).

(Continued)

*Primary Examiner* — Jael M Ulysse
(74) *Attorney, Agent, or Firm* — ScienBiziP, P.C.

(57) ABSTRACT

A method by a base station includes transmitting, via a first cell operating on a first component carrier, a first radio access network (RAN) profile indexing message to a user equipment (UE), the first RAN profile indexing message comprising a first plurality of Bandwidth Part (BWP) indices corresponding to a first plurality of BWP configurations, transmitting, via the first cell on a first resource block (RB) of a default BWP of the first component carrier, a first BWP index to the UE, the first BWP index corresponding to a first BWP configuration of the first plurality of BWP configurations. The at least one of the first plurality of BWP configurations includes a BWP index associated with the corresponding BWP configuration, and a frequency location of the corresponding BWP configuration, a bandwidth in the frequency domain, a transmission type, and one or more periodic resource allocations associated with the transmission type.

20 Claims, 24 Drawing Sheets

Related U.S. Application Data

(60) Provisional application No. 62/439,434, filed on Dec. 27, 2016.

(51) Int. Cl.
| | |
|---|---|
| *H04W 72/04* | (2023.01) |
| *H04W 72/1268* | (2023.01) |
| *H04W 72/044* | (2023.01) |
| *H04W 16/10* | (2009.01) |

(52) U.S. Cl.
CPC ..... *H04W 72/044* (2013.01); *H04W 72/1268* (2013.01); *H04W 74/006* (2013.01); *H04W 16/10* (2013.01)

(56) References Cited

U.S. PATENT DOCUMENTS

| | | | |
|---|---|---|---|
| 2015/0063259 A1* | 3/2015 | Gohari | H04W 28/20 370/329 |
| 2016/0007373 A1* | 1/2016 | Davydov | H04L 1/1812 370/329 |
| 2016/0294521 A1* | 10/2016 | Au | H04L 27/264 |
| 2018/0183551 A1* | 6/2018 | Chou | H04W 74/006 |
| 2019/0059086 A1* | 2/2019 | Saxena | H04L 5/0044 |
| 2019/0082454 A1* | 3/2019 | Shi | H04W 72/0406 |
| 2019/0253223 A1* | 8/2019 | Gong | H04L 5/0096 |

OTHER PUBLICATIONS

Samsung, R1-1713654, Wider Bandwidth Operations, 3GPP TSG RAN WG1 #90, 3GPP (Aug. 11, 2017).

\* cited by examiner

| BWP Index | Bandwith Part Configuration ||||||
|---|---|---|---|---|---|---|
| | Sub-carrier spacing | Multiplexing | Channel coding | TTI | Cyclic prefix | Modulation |
| 0 | Spacing #1 | Multiplex#1 | Coding#2 | TTI#1 | CP#1 | Modulation#1 |
| 1 | Spacing #1 | Multiplex#1 | Coding#1 | TTI#1 | CP#1 | Modulation#1 |
| 2 | Spacing #2 | Multiplex#1 | Coding#2 | TTI#1 | CP#1 | Modulation#2 |
| 3 | Spacing #3 | Multiplex#2 | Coding#3 | TTI#2 | CP#1 | Modulation#3 |
| ..... | ..... | ..... | ..... | ..... | ..... | ..... |
| k | Spacing #1 | Multiplex#3 | Coding#1 | TTI#2 | CP#1 | Modulation#4 |

METHOD FOR SIGNALING BANDWIDTH PART (BWP) INDICATORS AND RADIO COMMUNICATION EQUIPMENT USING THE SAME

CROSS-REFERENCE TO RELATED APPLICATION(S)

This application is a continuation application of U.S. patent application Ser. No. 15/855,105 filed on Dec. 27, 2017, which claims the benefit of and priority to a provisional U.S. Patent Application Ser. No. 62/439,434 filed Dec. 27, 2016, entitled "METHOD FOR SIGNALING RAN SLICING INDEX AND RADIO COMMUNICATION EQUIPMENT USING THE SAME." The contents of all above-named applications are fully incorporated herein by reference for all purposes.

FIELD

The present application generally relates to wireless communications, and pertains particularly to a method for signaling bandwidth part (BWP) indices and radio communication equipment using the same.

BACKGROUND

New Radio (NR) has been discussed in the 3rd Generation Partnership Project (3GPP) as a key technology for supporting the operation of the next generation (the fifth generation (5G)) wireless network. NR technology is expected to provide flexible radio protocol structure and architecture to accommodate a wide variety of service scenario requirements, such as high throughput, high reliability, low latency, and lower energy consumption.

RAN profile (also referred to as RAN slicing) is envisioned as a key enabling technology in NR. RAN profile allows a cell in a radio access network to adaptively configure parameters of a physical layer includes waveform parameters, coding parameters, modulation parameters, to accommodate the communications between the base station and the respective user equipments (UEs).

It is desirable for a cell to dynamically configure the RAN profile settings to accommodate the communication capability and service requirements of each UE in the cell. However, significant signaling overhead may be required every time the UE communicates (e.g., transmission/reception) with a base station, resulting in a waste of network resources and significant energy consumption.

Thus, there is a need in the art for a method for providing RAN profile information with reduced signaling overhead and latency.

BRIEF DESCRIPTION OF THE DRAWINGS

Aspects of the exemplary disclosure are best understood from the following detailed description when read with the accompanying figures. Various features are not drawn to scale, dimensions of various features may be arbitrarily increased or reduced for clarity of discussion.

FIG. 6 is a diagram illustrating a RAN profile indexing format for index signaling, in accordance with an exemplary implementation of the present application.

FIG. 10A is a diagram illustrating a DCI format having a BWP indicator field (BIF), in accordance with an exemplary implementation of the present application.

FIG. 10B is a diagram illustrating a DCI format having a BIF and a Carrier indicator filed (CIF), in accordance with an exemplary implementation of the present application.

DESCRIPTION

Figure 1:
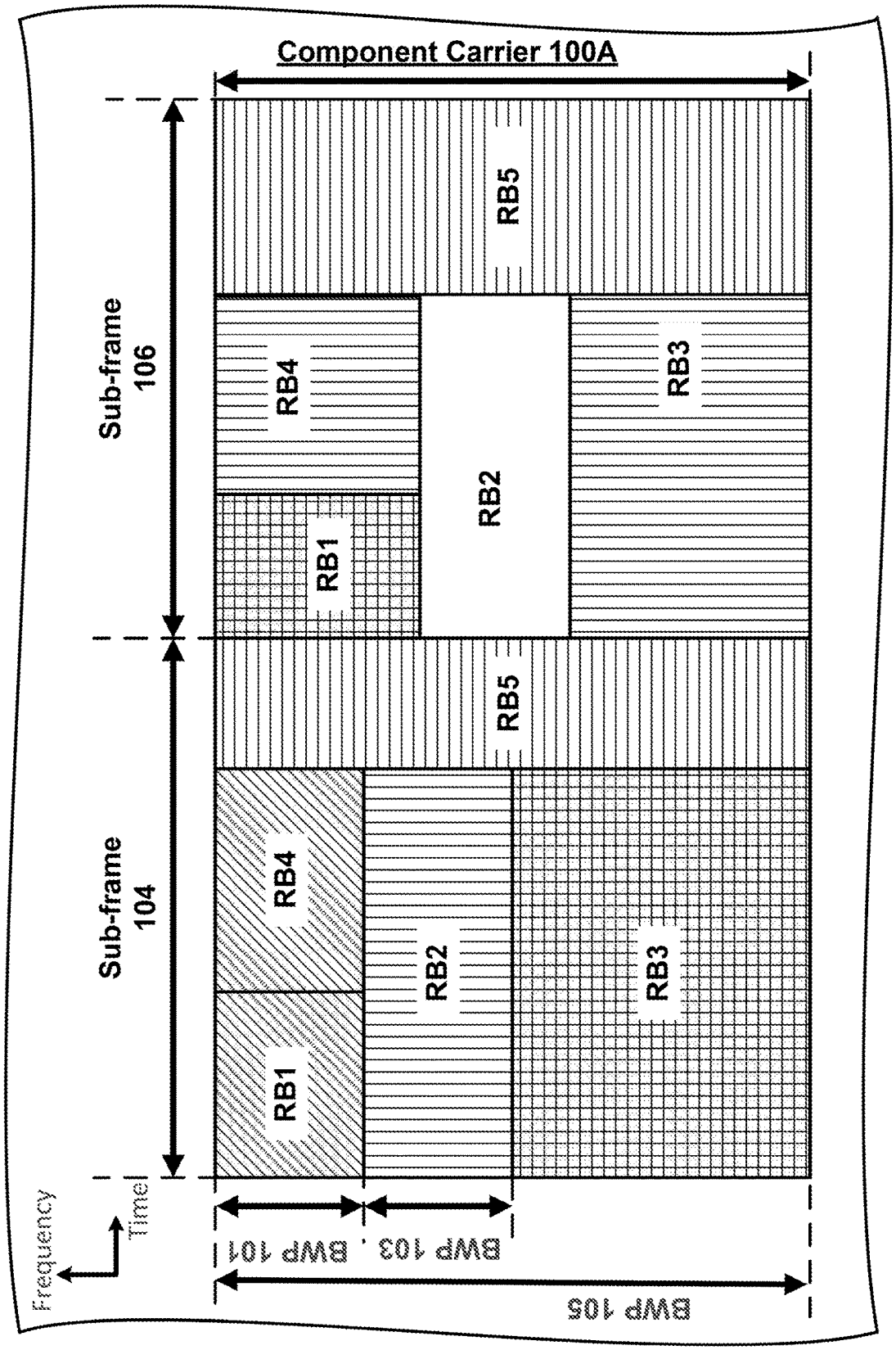
FIG. 1 is a diagram illustrating a radio access network (RAN) profile operation of a cell, in accordance with an exemplary implementation of the present application.

The following description contains specific information pertaining to implementations in the present application. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present application may be implemented by hardware, software or a combination of software and hardware. Described functions may correspond to modules may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in the present application are oriented to software installed and executing on computer hardware, nevertheless, alternative exemplary implementations implemented as firmware or as hardware or combination of hardware and software are well within the scope of the present application.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

The present application provides a method for signaling RAN parameters adopting a RAN profile indexing mechanism to facilitate the transmission and reception operations, where the RAN profile indices correspond to the physical layer compositions between a cell in a radio access network and at least one mobile station (e.g., a UE). By using the indexing mechanism to indicate the RAN profile information, the amount of signaling overhead and latency incurred for RAN profile may be greatly reduced, while supporting the flexibility of NR network system.

A radio communication network architecture (e.g., a long term evolution (LTE) system, a LTE-Advanced (LTE-A) system, or a LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access (E-UTRA) network, a Next-Generation Core (NGC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

A base station may include, but is not limited to, a node B (NB) as in the LTE, an evolved node B (eNB) as in the LTE-A, a radio network controller (RNC) as in the UMTS, a base station controller (BSC) as in the GSM/GERAN, a new radio evolved node B (NR eNB) as in the NR, a next generation node B (gNB) as in the NR, and any other apparatus capable of controlling radio communication and managing radio resources within a cell. The base station may connect to serve the one or more UEs through a radio interface to the network.

A base station may be configured to provide communication services according to at least one of the following radio access technologies (RATs): Worldwide Interoperability for Microwave Access (WiMAX), Global System for Mobile communications (GSM, often referred to as 2G), GSM EDGE radio access Network (GERAN), General Packet Radio Service (GRPS), Universal Mobile Telecommunication System (UMTS, often referred to as 3G) based on basic wideband-code division multiple access (W-CDMA), high-speed packet access (HSPA), LTE, LTE-A, New Radio (NR, often referred to as 5G), and/or LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage indicated by 3GPP TS 36.300, which is hereby also incorporated by reference. More specifically, each cell (often referred to as a serving cell) provides services to serve one or more UEs within its radio coverage, (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe). Each cell may have overlapped coverage areas with other cells.

As discussed above, the frame structure for NR is to support flexible configurations for accommodating various next generation (e.g., 5G) communication requirements, such as enhanced mobile broadband (eMBB), massive machine type communication (mMTC), ultra reliable communication and low latency communication (URLLC) more efficiently, while fulfilling high reliability, high data rate and low latency requirements. The orthogonal frequency-division multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may be also used. Additionally, three candidate coding schemes are considered for NR: (1) low-density parity-check (LDPC), (2) Polar Code, and (3) Turbo Code. The coding scheme adaption may be configured based on the channel conditions and/or the service applications. Moreover, it is also considered that in a transmission time interval $T_x$ of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR.

According to exemplary implementations of the present application, various RAN profile techniques are adopted to support the above-mentioned flexibilities in NR. FIG. 1 is a diagram illustrating a RAN profile operation of a cell, in accordance with an exemplary implementation of the present application. In FIG. 1, each RAN profile may be composed of a corresponding Bandwidth Part (BWP) configuration. As shown in FIG. 1, component carrier 100A includes BWPs 101, 103, and 105. In addition, a cell may assign different resource blocks (RBs) RB1, RB2, RB3, RB4, and RB5 to different UEs in a radio access network. Each RB represents a set of radio resource including, but is not limited to, a group of resource elements spanning a number of subcarriers in the frequency domain and a number of symbols in the time domain. As shown in FIG. 1, the transmission of sub-frame 104 precedes the transmission of sub-frame 106. In the radio access network, each BWP may be configured to provide different physical layer (PHY) compositions.

Each BWP configuration may comprise a PHY composition, which may include at least one of the following:

a numerology having a cyclic prefix and a subcarrier spacing configuration;
a bandwidth in frequency domain;
a frequency location of the BWP configuration;
Control-Resource Set (CORESET) configurations, which may include control search space configuration for UE to monitor and decode control signalings;
a transmission type (e.g., DL, guard, SL, or UL);
a uplink (UL) grant free resource configuration;
a Semi-Persistent-Scheduling (SPS) configuration;
a default BWP indication having an applicable RRC state; and
a BWP indicator (e.g., BWP index) corresponding to the BWP configuration.

In addition, each BWP configuration may also include a coding scheme, a modulation scheme, and the like.

Different BWPs may have the different PHY compositions. For instance, RB1 and RB4 in sub-frame 104, which are configured based on BWP 101, may be configured with 15 kHz sub-carrier spacing, 0.25 ms transmission time interval (TTI), LDPC coding for DL transmission, while RB2 in sub-frame 104, which is configured based on BWP 103, may be configured with 60 kHz sub-carrier spacing, 0.75 ms TTI, and Turbo coding for UL transmission. The cell (e.g., eNB in LTE/LTE-A, NR eNB in NR, or NR gNB in NR) may allocate resource blocks RB1 and RB4 in sub-frame 104 to UE1 and RB2 in sub-frame 104 to UE2, depending on the capabilities of UE1 and UE2.

The cell may reconfigure the BWP configuration(s) to the same UE in a subsequent transmission frame(s) (e.g., sub-frame 106) depending on the required transmission/reception criteria, such as the channel quality (e.g., CQI) between the cell and the UE, the service requirement of the UE and/or the available network resource. For example, sub-frame 106 may have RB1 with a different BWP configuration from that of RB1 in sub-frame 104 to the same UE. In contrast, the cell does not need to reconfigure or indicate the BWP configuration(s) in a subsequent transmission frame(s) to the same UE. For example, BWP 105 is configured to a UE, and RB5 is allocated to this UE in subframe 104. Then, the cell may allocate RB5 to the same UE in sub-frame 106 without further indicating the configured BWP (e.g., BWP 105) to the UE. So, the UE may keep transmit/receive packets on the given RB5 of sub-frame 106 based on the PHY composition of BWP 105. In addition, the size of each resource block in one BWP may vary, and may be dynamically configured based on the scheduling operation. For example, the size of RB5 of BWP 105 allocated in sub-frame 104 is smaller than the size of RB5 (which is also configured by the PHY composition of BWP 105) in sub-frame 106.

Since a cell can dynamically configure RAN profile settings (e.g., BWP configurations each having a PHY composition) based on the network operation or applications, the cell may need to constantly communicate with the one or more UEs within its cell coverage and send the PHY compositions adoption information to the UEs for the UEs to be able to properly encode/decode the corresponding RBs, accordingly. As a result, implementations of the present application provide RAN profile indexing signaling mechanisms for an NR communication system capable of reducing the amount of signaling overhead resulting from these dynamic PHY compositions, thereby reducing the radio resource consumption during transmission as well as the latency incurred between end-to-end transmissions.

According to an exemplary implementation of the present application, an NR communication system includes at least one base station and at least one UE. The base station provides a radio coverage for a specific geographical area forming a radio access network using a plurality of cells. The cells are communicatively linked to a base station, and the base station coordinates the operations of the cells. The cells may have one or more overlapped coverage areas. Each cell operatively allocates and schedules downlink and uplink resources to the respective UE within its cell coverage. Each cell may further allocate sidelink (SL) resources for supporting proximity service (ProSe) communication.

Each cell performs a RAN profile indexing operation and defines a plurality sets of RAN parameters corresponding to a plurality of RAN profiles, where each RAN profile is composed of a corresponding BWP configuration having a PHY composition, and each BWP configuration is identified by a corresponding BWP index.

During the execution of the RAN profile indexing operation, a cell assigns each of PHY compositions 1 through N of the respective BWP configurations 1 through N with a corresponding BWP index (e.g., BWP indices 1 through N, wherein N is an integer). Each BWP index has a specific mapping with the PHY composition of the corresponding BWP configuration (e.g., L1 configuration in LTE/LTE-A system). Each of the BWP indices 1 through N and each of the PHY compositions 1 through N have one-to-one correspondence. For example, BWP Index #1 may be configured to correspond to PHY composition of BWP configuration #1 (BWP #1), while BWP Index #2 may be configured to correspond to PHY composition of BWP configuration #2 (BWP #2) and so on.

Thereafter, each cell can simply transmit an BWP index corresponding a particular set of RAN parameters, which in turn corresponds to a particular PHY composition of a BWP. In addition, UE may keep encoding and/or decoding RBs based on the given PHY compositions of the BWPs in the subsequent packet transmissions/receptions in the cell until the base station switches the PHY compositions for the UE in the same cell. That is, the BWP index represents the type of RAN profile applied to the corresponding RB(s) assigned to the corresponding UE during subsequent transmissions/receptions, thereby greatly reducing the signaling overhead and the latency that may incur.

In one implementation, each cell may periodically signal the RAN profile adaption by broadcasting the BWP index or indices (e.g., through broadcasting system information) to facilitate the transmission and reception operations between the cell and the respective one or more UEs in the cell after executing the RAN profile indexing operation.

In some implementations, each cell may send the RAN profile indexing information to one or more UEs within its cell coverage using unicast transmission, for example, when a UE enters the cell coverage (e.g., through dedicated Radio Resource Control signaling to the UE) or upon receiving the request for system information (SI) from the UE.

Figure 2A:
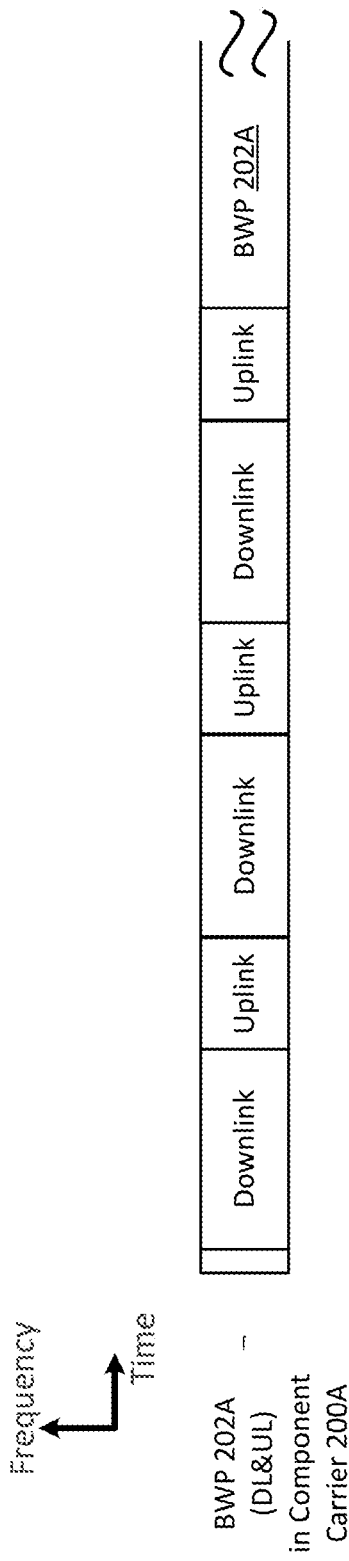
FIG. 2A is a diagram illustrating an exemplary paired Bandwidth Part (BWP) configuration, in accordance with an exemplary of the present application.

FIG. 2A is a diagram illustrating an exemplary paired BWP configuration, in accordance with an implementation of the present application. In component carrier 200A, paired BWP 202A includes a spectrum and a (portion of) shared PHY composition for both downlink and uplink operations through time division duplex (TDD). In one implementation for paired BWP configuration, the configuration of DL/UL division is part of the PHY composition of the paired BWP configuration. So, a UE can retrieve the configuration DL/UL division after obtaining the BWP index of the corresponding BWP configuration. In some other embodiments, the network may deliver the configuration of DL/UL division by another control signaling, which is encoded and multiplexed based on at least one of the CORESET configurations of the indicated BWP configuration. So, UE may obtain the configuration DL/UL division by searching control signaling based on the retrieved CORESET configuration of the indicated BWP configuration.

Figure 2B:
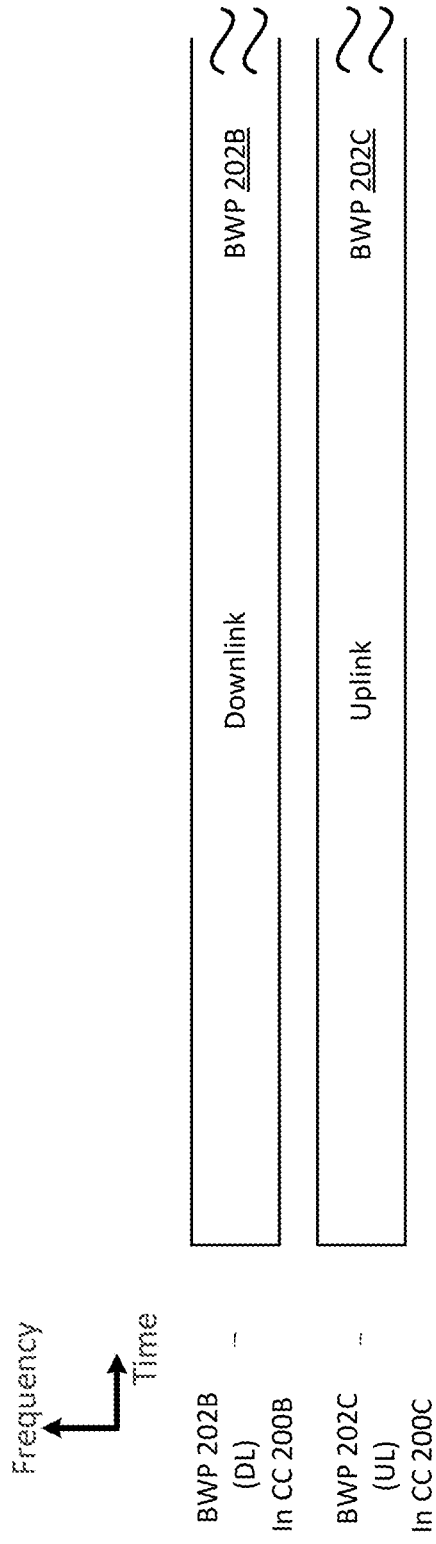
FIG. 2B is a diagram illustrating exemplary unpaired BWPs, in accordance with an exemplary of the present application.

FIG. 2B is a diagram illustrating exemplary unpaired BWPs, in accordance with an implementation of the present application. As shown in FIG. 2B, DL and UL BWPs are each configured in a separate component carrier. For example, unpaired BWP 202B includes a spectrum of downlink BWP in component carrier 200B, while unpaired BWP 202C includes a spectrum of uplink BWP in component carrier 200C. In one implementation, for unpaired BWPs, DL BWP 202B and UL BWP 202C may be jointly configured with different bandwidths, for example.

Figure 3:
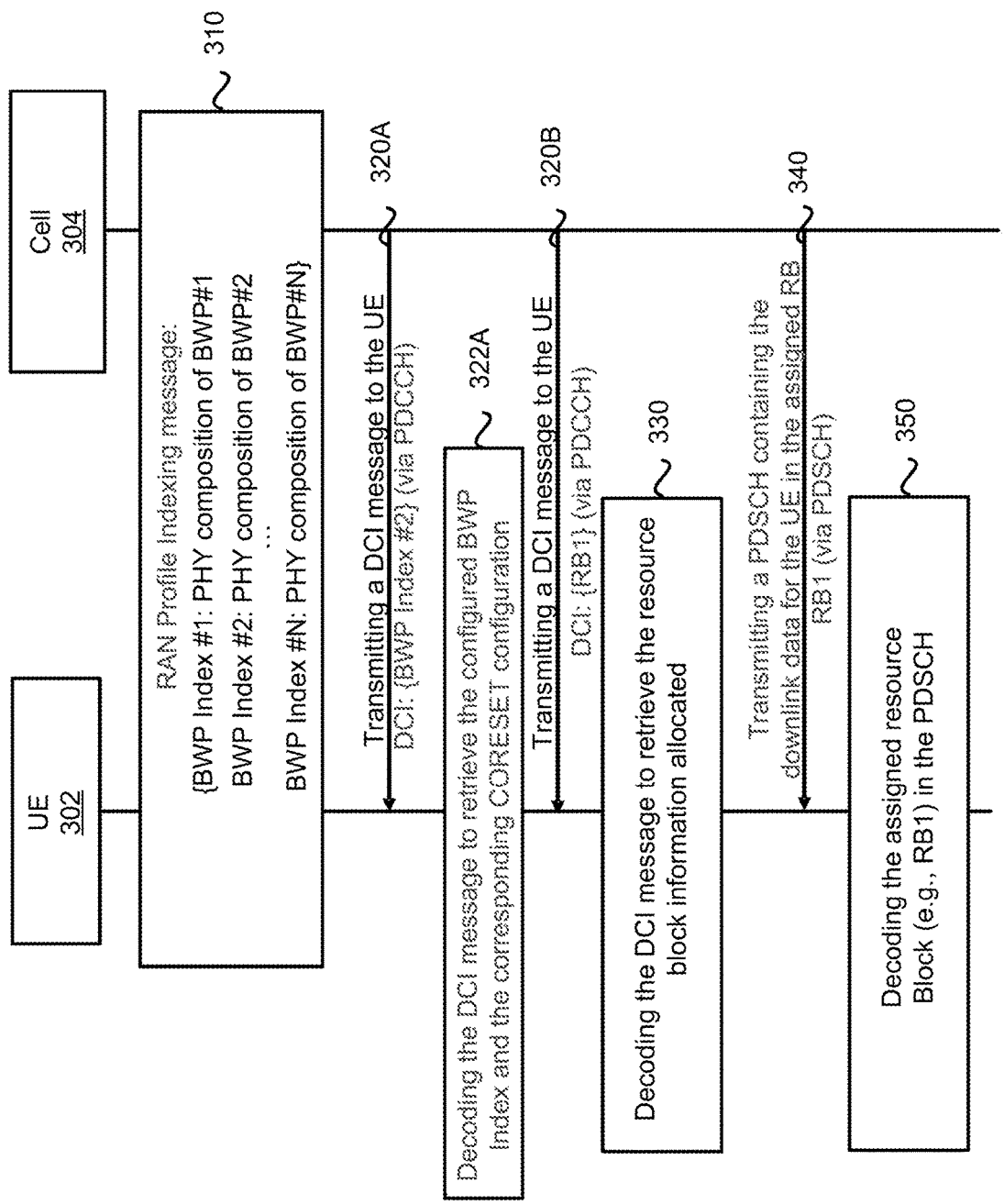
FIG. 3 shows a diagram illustrating a method for signaling RAN profile indexing, in accordance with an exemplary implementation of the present application.

FIG. 3 shows a diagram illustrating a method for signaling RAN profile indexing, according to an exemplary implementation of the present application.

In action 310, cell 304, operating on a component carrier, transmits (e.g., periodically or aperiodically) a RAN profile indexing message to one or more UEs within its cell coverage, for example, using a broadcasting channel (BCH). The RAN profile indexing message at least contains information on a plurality of sets of RAN parameters, each set of the RAN parameters corresponds to the settings (e.g., BWP configuration) of a specific BWP. The RAN profile indexing message also contains a plurality of BWP indices corresponding to the plurality of sets of RAN parameters. Each of the plurality of sets of RAN parameters corresponds to a specific PHY composition. The PHY compositions can each map to a BWP index that corresponds to a specific BWP configuration of a BWP. UE 302, upon receiving the RAN profile indexing message, stores the RAN profile indexing information having the BWP configurations (e.g., PHY compositions) and the corresponding BWP indices for subsequent transmission/reception operations. It should be noted that, in the present implementation, cell 304 may be an NR eNB/gNB in an NR communication network or an eNB in a LTE/LTE-A communication network.

In action 320A, cell 304 transmits to UE 302 using a Downlink Control Information (DCI) message in a Physical Downlink Control Channel (PDCCH), where the DCI message may include a BWP index that corresponds to one specific BWP configuration. For example, when cell 304 decides to apply the PHY composition of BWP configuration #2 (i.e., BWP #2) in a Physical Downlink Shared Channel (PDSCH) for downlink (DL) transmission, cell 304 may transmit the DCI message, containing information indicating BWP Index #2, to UE 302 via a PDCCH. In action 322A, UE 302 decodes the DCI message to retrieve the BWP index (e.g., BWP Index #2). Based on the decoded BWP index, UE 302 may further retrieve the corresponding PHY composition of the corresponding BWP (e.g., PHY composition of BWP #2) for the subsequent communication with cell 304. Then, UE 302 may decode subsequent DL packets continuously based on the PHY composition of BWP configuration #2.

In action 320B, cell 304 transmits to UE 302 a DCI message in a PDCCH. The DCI message may include resource block allocation information. For example, when cell 304 decides to allocate a specific resource block (e.g., RB1 of FIG. 1) in a Physical Downlink Shared Channel (PDSCH), in which the PHY composition of BWP #2 is applied for downlink (DL) transmission to UE 302, the DCI message may contain information indicating the allocation of assigned RB1 for a subsequent PDSCH for data transmission, for example.

In action 330, UE 302 decodes the DCI message to retrieve the resource block allocation information, the allocation of the assigned RB (e.g., RB1) in the subsequent PDSCH for data transmission, for example.

In one implementation, the BWP index that corresponds to one of the plurality of sets of PHY compositions for a specific RAN profile (BWP configuration) in action 320A and the resource block allocation information in action 320B may be transmitted to UE 302 from cell 304 in a single DCI message, in which case, UE 302 may decode the DCI message to retrieve both the BWP index (and then retrieve the corresponding PHY composition) and the resource block allocation information.

In one implementation, cell 304 may allocate the resource block within the PDSCH through a scheduling operation. Scheduling may involve known resource allocation techniques in the art, the descriptions of which are hereby omitted for brevity.

In action 340, cell 304 transmits a PDSCH containing downlink data to UE 302 in the assigned resource block (e.g., RB1).

In action 350, UE 302 decodes the assigned resource block (e.g., RB1) in the PDSCH according to the PHY composition of the corresponding to the BWP (e.g., BWP #2). By using the indexing mechanism for RAN profile, UE 302 can decode the DL transmission data with the index information received from cell 304 without requiring additional PHY composition information, thereby reducing signaling overhead and latency.

In one implementation, cell 304 may execute a RAN profile indexing operation and update RAN profile settings (e.g., reconfiguring BWP parameters and indices) upon receiving the request for system information from one or more UEs within its cell coverage. Cell 304 may then transmit the updates or the changes to the RAN profile settings to the respective UEs within its cell coverage.

In one implementation, cell 304 may execute the RAN profile indexing operation and update RAN profile settings (e.g., reconfigure BWP configurations and BWP indices) upon receiving a report from the core network (CN) indicating the backhaul capability and types of service application processing. The cell may then broadcast the updates or the changes to the RAN profile settings to notify the UEs within its cell coverage.

In one implementation, it may be advantageous to allocate the same resource block(s) with the corresponding BWP index(ices) to the same UE. In another implementation, it may be advantageous to allocate the same resource block(s) with the corresponding BWP index(ices) to different UEs. In yet another implementation, it may be advantageous to allocate different resource block(s) with the corresponding BWP index(ices) to different UEs.

For example, when a cell is communicating with two UEs (e.g., UE 1 and UE 2) within its cell coverage, the cell may allocate the same resource block to both UEs, but assigning different BWP indices indicating different modulation schemes. For example, the cell may require UE 1 to apply non-orthogonal multiplexing upon receiving the assigned RB, and require UE 2 to apply orthogonal multiplexing upon receiving the assigned RB.

In one implementation, the base station may comprise a plurality of radio communication equipments. The plurality of radio communication equipments is configured to support the operation the plurality of cells. More specifically, the radio communication equipments may each be configured to allocate uplink, downlink, and/or sidelink resources to one or more UEs within its cell coverage. The radio communication equipments may each include a built-in memory configured to store the RAN profile information (e.g., BWP configurations and corresponding BWP indices) of the corresponding cell.

It is worthy to note that the RAN profile indexing operation may be either cell-based (cell-specific RAN profile) or user-based (user-specific RAN profile) depending on the service requirement and capability of the UE and/or the network resource and system capability of the cell. In other words, RAN profile (e.g., BWP configuration) may be performed based on the overall cell dynamics or performed to accommodate the communication capability of the UE. Various implementations on signaling RAN profile indexing in a radio communication system are next described.

In a cell-specific RAN profile scenario, the RAN profile indexing and PHY composition mapping may be common for all serving UEs within the radio coverage of a specific cell. However, different cells may have their own RAN profile indexing mechanisms and PHY composition mappings (to the corresponding BWP) within their respective cell coverages. For example, different cells may have different RAN profile indexing within the coverage of each cell (e.g., the PHY composition of cell 1's BWP configuration #1 (BWP index #1) is different from the PHY composition of cell 2's BWP configuration #2 (BWP index #1)). In one implementation, a cell may include a gNB. In another implementation, a cell may include a remote radio head (RRH). In another implementation, a cell may include a component carrier (CC). In yet another implementation, a cell may include a base station (BS).

Figure 4:
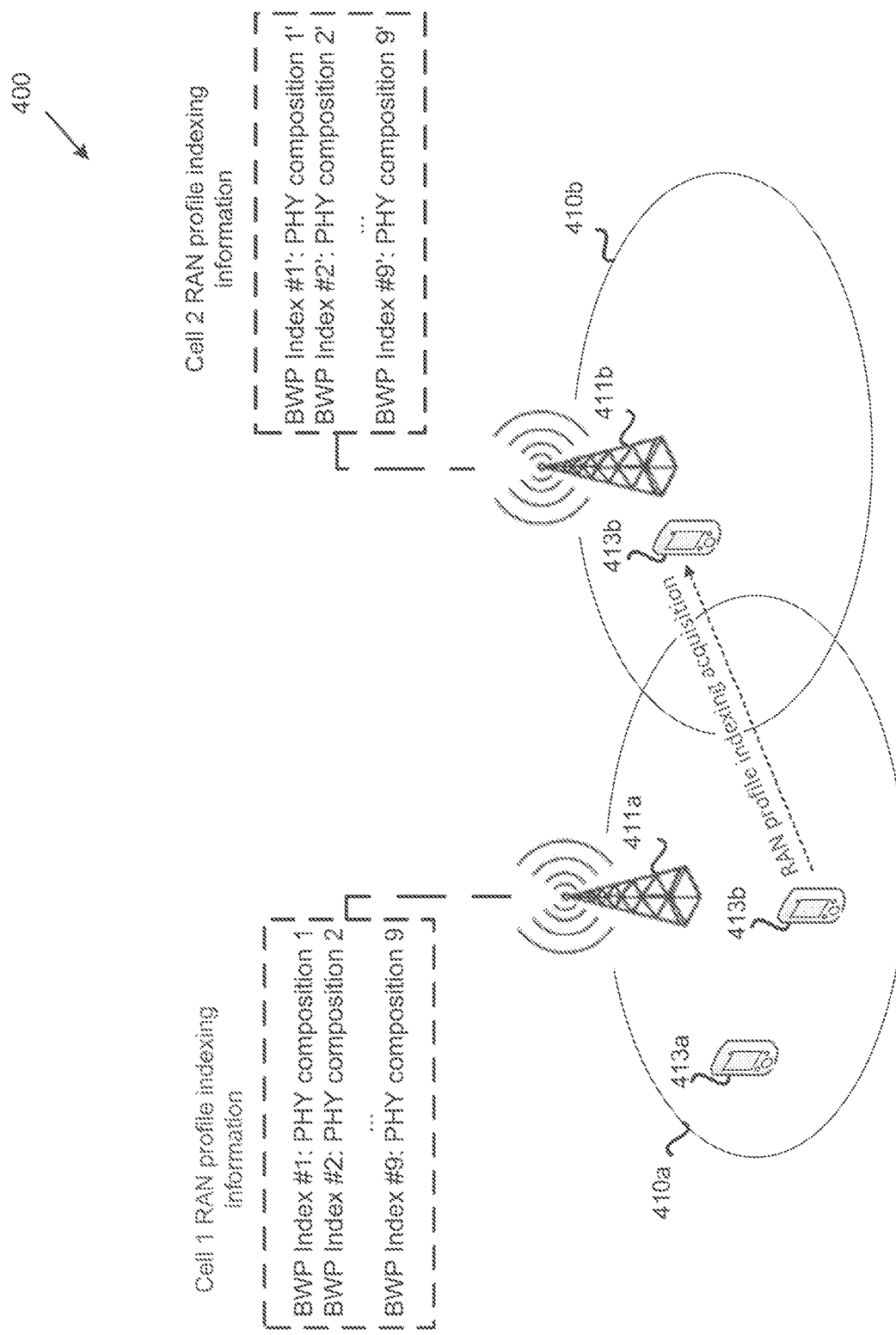
FIG. 4 illustrates a cell-specific RAN profile indexing operation, in accordance with an exemplary implementation of the present application.

FIG. 4 illustrates a cell-specific RAN profile operation, in accordance with an exemplary implementation of the present application. Exemplary radio communication system 400 includes a radio access network (RAN) and a core network (CN). The RAN comprises cell 410a and cell 410b. Each cell (e.g., cell 410a/410b) covers a geographical area. The radio coverage of cells 410a and 410b may have an overlapped geographical area as depicted in FIG. 4. Cells 410a and 410b are communicatively linked to a base station (e.g., a physical base station, not explicitly shown in FIG. 4). The operations of cells 410a and 410b may be coordinated by the base station. Radio communication system 400 further includes UEs 413a and 413b presently located within the radio coverage of cell 410a.

Radio communication equipment 411a may be deployed in cell 410a to provide the radio converge to the corresponding cell area. Radio communication equipment 411a communicates with the base station, and provides services to UEs 413a and 413b. Radio communication equipment 411b may be deployed in cell 410b to provide the radio converge to the corresponding cell area. Radio communication equipment 411b communicates with the base station, and provides services to the UEs within its cell coverage.

As shown in FIG. 4, UE 413b is moving from cell 410a toward cell 410b. Cell 410a adopts the indices 1 through 9 (e.g., BWP indices 1 through 9) for indicating PHY compositions 1 through 9 of BWP configurations 1 through 9, respectively. Cell 410b adopts indices 1' through 9' (e.g., BWP indices 1' through 9') for indicating PHY compositions 1' through 9' of BWP configurations 1' through 9', respectively. In the present implementation, indices 1 through 9 adopted by cell 410a are different from indices 1' through 9' adopted by cell 410b, respectively. As such, RAN profile indexing acquisition procedures may be required, as UE 413b moves from cell 410a toward cell 410b. During the RAN profile indexing acquisition procedures, cell 410a is the source cell and cell 410b is the target cell.

The RAN profile indexing of the cells may be reconfigured by a downlink control message (e.g., RRC signaling, RRCConnecitonReconfiguration). In some implementations, the RAN profile indexing may be reconfigured semi-statically. In some implementations, the RAN profile indexing may be reconfigured dynamically. Moreover, for semi-static reconfiguration, in some implementations, a timer of the cell prevents the cell from reconfiguring the RAN profile indexing for a period of time. After the RAN profile indexing is acquired by the UE, the timer of the cell will start and the UE does not need to trace the RAN profile indexing until the timer of the cell expired. The cell may then reconfigure the timer value to the UE by another signaling. In some implementations, the cell may then reconfigure the timer value to the UE with the RAN profile indexing. Furthermore, when the cell entity is collocated for different PLMNs, the cell can have respective RAN profile indexing for each PLMN.

In some implementations, the indication of RAN profile indexing may be transmitted via dedicated RRC message. In some implementations, the indication of RAN profile indexing may be transmitted via periodic SI (System Information). In some implementations, the indication of RAN profile indexing may be transmitted via on-demand SI.

Moreover, the core network may also provide its recommends toward the RAN profile indexing. In some implementations, in order to fulfill end-to-end latency requirement, different cells may require different PHY compositions based on the backhaul capability of each cell to the core network. In some implementations, a plurality of cells has a RAN profile indexing, (e.g., a default and common index table for describing the associating composition). Therefore, the cells are not required to provide the RAN profile indexing. Therefore, the RAN profile indexing is configured for all serving UEs within the cell coverage.

Different from the cell-specific RAN profile implementation, under a user-specific RAN profile implementation, each UE may have its own dedicated RAN profile indexing and PHY composition mapping information within a cell coverage. The UEs within one cell coverage may have the same or have different RAN profile indexing settings.

Figure 5:
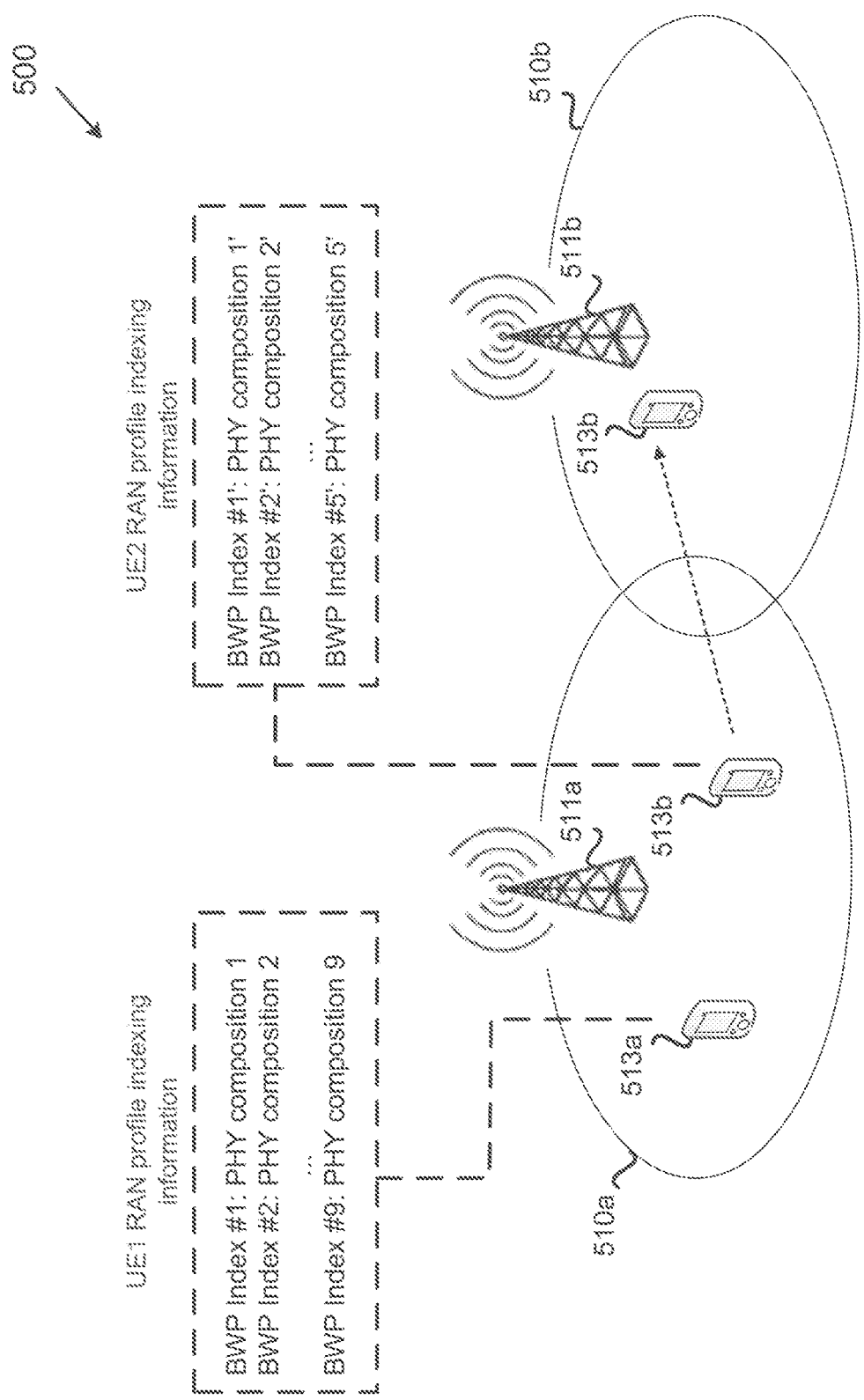
FIG. 5 illustrates a user-specific RAN profile indexing operation, in accordance with an exemplary implementation of the present application.

FIG. 5 illustrates a user-specific RAN profile indexing operation, in accordance with an exemplary implementation of the present application. Exemplary radio communication system 500 includes a radio access network (RAN) and a core network (CN). The RAN includes cell 510a and cell 510b. Each cell (e.g., cell 510a or cell 510b) covers a geographical area. the radio coverage of cells 510a and cell 510b may have an overlapped geographical area as depicted in FIG. 5. The cells are communicatively linked to a base station (e.g., a physical base station, not explicitly shown in FIG. 5). The operations of cells 510a and 510b are coordinated by the base station. UEs 513a and 513b are presently located within the radio coverage of cell 510a, and served by cell 510a. UE 513b is moving toward the cell 510b, such that a handover procedure may be implemented to UE 513b. During the handover procedure, cell 510a is the source cell and cell 510b is the target cell.

In FIG. 5, radio communication equipment 511a may be deployed in cell 510a to provide the radio converge to the corresponding cell area. Radio communication equipment 511a communicates with the base station, and provides services to the UEs 513a and 513b. Radio communication equipment 511b may be also deployed in cell 510b to provide the radio converge to the corresponding cell area. Radio communication equipment 511b communicates with the base station, and provides services to the UEs within its cell coverage.

UE 513a and UE 513b in the present implementation may support different PHY compositions due to their different capabilities, therefore have different RAN profiles (hence different PHY compositions where each PHY composition corresponds to a specific BWP configuration). UE 513a and UE 513b may have different sets of indices (e.g., BWP indices) and PHY compositions (e.g., BWP configurations) mapping. Specifically, UE 513a may adopt indices 1 through 9 (e.g., BWP indices 1 through 9) corresponding to PHY compositions 1 through 9 (e.g., corresponding to BWP configurations 1 through 9), respectively. UE 513b may adopt indices 1' through 5' (e.g., BWP indices 1' through 5') corresponding to PHY compositions 1' through 5' (e.g., corresponding to BWP configurations 1' through 5'), respectively.

Cells 510a and 510b may execute RAN profile indexing operation based on their individual communication capabilities, types of subscription, service requirements, and QoS requirements of UEs 513a and 513b.

In one implementation, the CN in radio communication system 500 may recommend the RAN profile indexing and the PHY composition settings related to UE's RAN profile indexing to cells 510a and 510b based on CN/RAN operation criteria, such as fronthaul and backhaul capabilities. Different cells may require different PHY compositions to fulfill end-to-end latency requirements. In one implementation, the CN may include one or more network elements for configuring RAN profile indexing based on the network operating criteria, such as the fronthaul capability between the UEs and the cells and/or the backhaul capability between the cells in radio communication system 500.

In some implementations, each of the UEs may have different RAN profile indexing amount. Moreover, the core network may provide recommendations toward the RAN profile indexing, since different cells may require different PHY compositions (e.g., of the corresponding BWP configurations) to respectively fulfill end-to-end latency requirement of UEs in response to backhaul capability of each cell. In some implementations, the core network may provide recommendations toward the RAN profile indexing, since different cells may require different PHY compositions (e.g., of the corresponding BWP configurations) to respectively fulfill end-to-end latency requirement of UEs in response to front-haul capability of each cell. Furthermore, in some implementations, the cell may exchange the RAN profile indexing with neighboring cells. For example, in handover preparation, the cell may exchange the RAN profile indexing with neighboring cells via X2 interface or S1 interface.

Moreover, when a cell does not assign any RAN profile indexing to a UE (e.g., did not signal the UE with an assigned RAN profile indexing during an RRC connection establishment phase), the UE may use a default PHY composition (e.g., a default BWP configuration) for resource block (RB) processing during the transmission/reception operations. In some embodiments, the default PHY composition may be pre-defined in technical specifications. In some implementations, when the cell assigns RAN profile indexing, the cell may further indicate the RAN profile indexing in response to RRC states. If the cell does not indicate the RAN profile indexing for different RRC states, the cell may provide a RAN profile indexing for all RRC states. In some implementations, if the cell does not indicate the RAN profile indexing for different RRC states, the cell may provide a RAN profile indexing for the current RRC state. Moreover, The RRC states include RRC connected state, RRC inactive state, light connected RRC connected state, light connected RRC idle state, and RRC idle state. As shown in FIG. 5, in some implementations, when UE 513*b* moves from cell 510*a* to cell 510*b*, RAN profile indexing acquisition procedures of UE 513*b* and cell 510*b* may not be required since cell 510*b* may support the RAN profile indexing of UE 513*b* provided by cell 510*a*.

Furthermore, in some implementations, the RAN profile indexing of the UE and the cell may be configured in response to the running applications and cell condition. In some implementations, when a UE roams to another PLMN, the RAN profile indexing of the UE and the cell may be re-assigned by the RAN. In some implementations, when UE roams to another PLMN, the RAN profile indexing of the UE and the cell may be re-assigned by the CN. In some other implementations, when a UE makes an RRC state transition, the RAN profile indexing of the UE and the cell may be configured. Therefore, the RAN profile indexing of the UE and the cell may be configured semi-statically within the cell's coverage. In some other implementations, the RAN profile indexing of a UE and a cell may be configured dynamically within the cell's coverage.

Furthermore, the indication of RAN profile indexing may be transmitted via an RRC message. In some implementations, the indication of RAN profile indexing may be transmitted via a MAC Control Element (CE).

FIG. 6 is a diagram illustrating a RAN profile indexing format for index signaling, in accordance with an exemplary implementation of the present application. In one implementation, the RAN profile indexing information may take the form of an information element (IE). FIG. 6 shows an exemplary index format in the form of an information element, according to an exemplary implementation of the present application.

As shown in FIG. 6, a RAN profile indexing format in the form of an information element (IE) comprises BWP indices 0 through k, where k is an integer, and each BWP index is associated with a corresponding RAN parameter IE, which comprising a set of RAN parameters. Each RAN parameter IE may include a set of PHY composition fields. Each PHY composition is corresponding to one BWP configuration, where the BWP configuration may include, but is not limited to, a sub-carrier spacing, a multiplexing scheme, a channel coding scheme, a transmission time interval (TTI), a cyclic prefix and a modulation scheme, where the field addresses may be associated with the adopted physical layer parameters linked to and the BWP Index assigned. In one implementation, the IE may further include the RRC states that each BWP configuration is associated with. Each Index in the BWP Index field may be associated with a set of fields within the IE.

For example, Index 0 may correspond to a sub-carrier spacing #1, a multiplexing #1, a channel coding scheme #2, a TTI #1, a CP #1, and a modulation scheme #1. Index 1 may correspond to a sub-carrier spacing #1, a multiplexing #1, a channel coding scheme #1, a TTI #1, a CP #1, and a modulation scheme #1. Index k may correspond to a sub-carrier spacing #1, a multiplexing #3, a channel coding scheme #1, a TTI #2, a CP #1, and a modulation scheme #4.

It may be advantageous to have the IE cover more transmission related parameters. Thus, the IE shall not be limited by the listed fields/elements shown in FIG. 6. Moreover, a cell may optionally append the fields in the IE based on its determination from the channel condition, the network system capability, and the UE's capability. For the fields that do not appear in the IE, the UE is to apply a set of default parameters.

In some implementations, the IE may carry a field of direction (e.g., DL, UL, SL, and etc.). In some implementations, the IE may carry a field of respective field addresses of the adopted parameter for the relevant index. The RAN profile indexing further includes a frame structure (e.g., mini-slot configuration). In some implementations, the IE of a cell may carry fields in response to the cell's decision. For fields not explicitly appeared in the IE, a UE may apply default parameters accordingly. Thus, the default parameters may represent the default parameters stored in hardware module or default RAN profile indexing provided by the RAN or CN or by technical specifications.

Among other advantages, using information element to conveying RAN profile indexing for signaling procedure allows a cell to flexibly construct PHY compositions and to map the PHY compositions to the respective information elements based on criteria, such as channel condition, service requirement, quality of service (QoS) requirements and the like.

Figure 7:
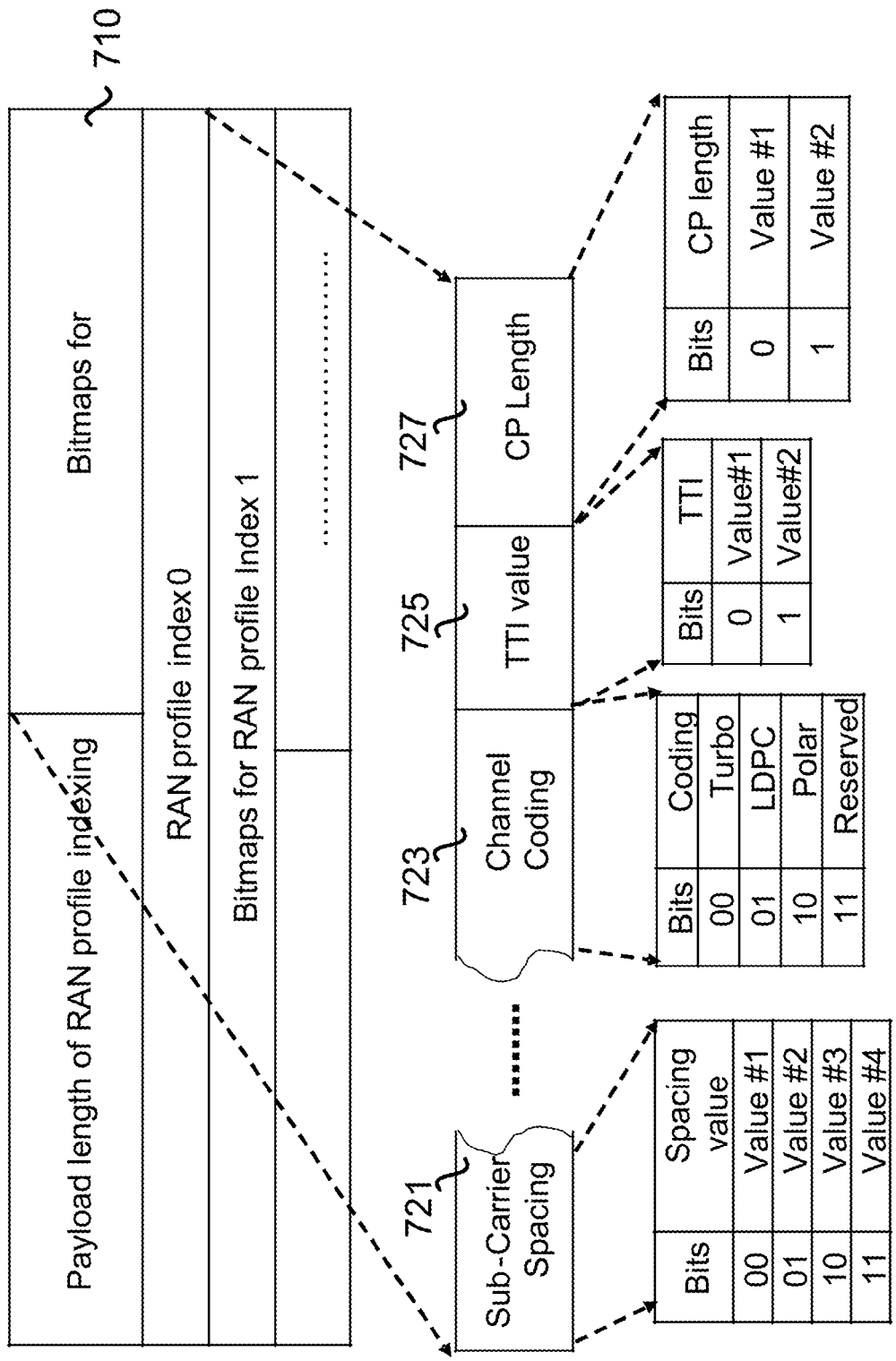
FIG. 7 illustrates a diagram of a bitmap indexing format, in accordance with an exemplary implementation of the present application.

FIG. 7 illustrates a diagram of a bitmap indexing format, in accordance with an exemplary implementation of the present application. In FIG. 7, a predetermined bitmap 710 may be used by a cell for signaling RAN profile indexing. Bitmap 710 has a fixed length and limited number of components. The components include, but are not limited to, sub-carrier spacing 721, channel coding 723, TTI value 725, and CP length 727. Bits can be allocated to represent the PHY composition settings, such as a sub-carrier spacing value, a channel coding mode, a TTI value, a CP length value, a multiplexing mode, and/or a frame type mode. The cell may configure the specific PHY composition setting by manipulating specific bits. The UE can later translate the specific bitmaps to the dedicated PHY compositions of the corresponding BWP configurations.

A cell may include a network element specifying the payload lengths of all RAN profile indexing formats, and append the bitmap for each associated index. The bitmap format of RAN profile indexing is valid for all cells and UEs within the radio communication system and UEs regardless of cell-specific or user-specific RAN profile indexing.

Figure 8A:
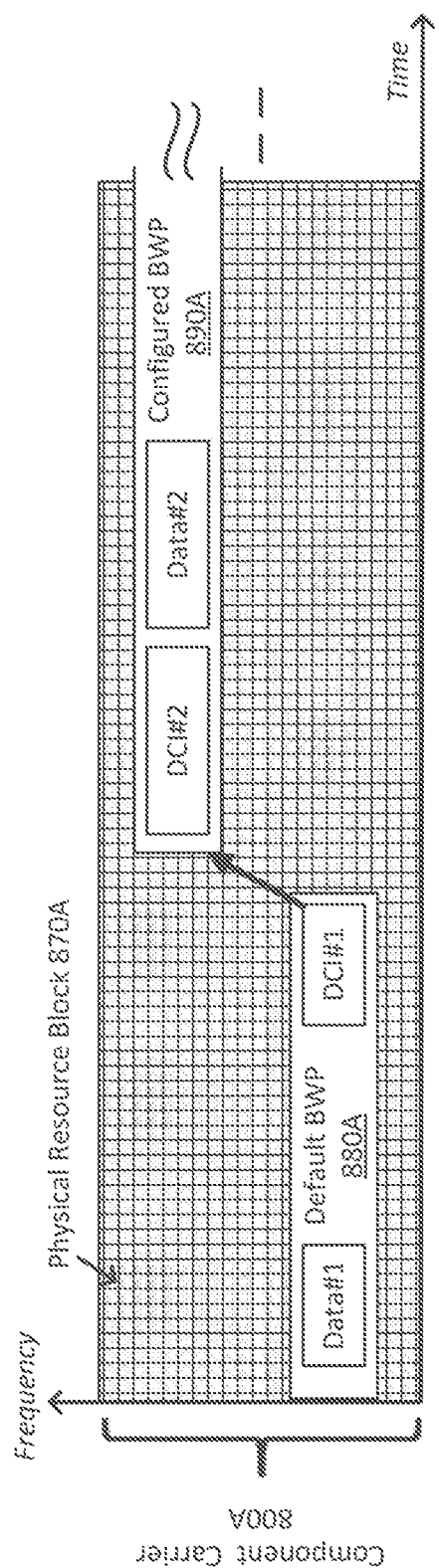
FIG. 8A is a diagram showing a BWP switching procedure using downlink control information (DCI), in accordance with an exemplary implementation of the present application.

FIG. 8A is a diagram showing a BWP switching procedure using DCI, in accordance with an exemplary implementation of the present application. As shown in FIG. 8A, component carrier 800A includes a plurality of physical resource blocks 870A. A cell may transmit (e.g., broadcast) packets based on the default BWP 880A to one or more UEs in its coverage area. In one implementation, the cell transmits to a UE, in default BWP 880A, DCI message #1 (DCI #1), where DCI #1 includes a configured BWP index that corresponds to configured BWP 890A, and a switching/activation instruction to switch to configured BWP 890A.

When the UE receives DCI #1 in default BWP 880A, the UE decodes DCI #1 to retrieve the BWP index and the switching/activation instruction. The UE may switch to configured BWP 890A based on the decoded BWP index, as shown in FIG. 8A.

In one implementation, DCI #2 may be a CORESET. The UE receives the CORESET to receive further control information (PDCCHs) in the CORESET. The PDCCHs in the CORESET may indicate other RBs, which may include data or other control information, for UE to communicate with the RAN. In some implementations, the CORESET configuration is pre-configured with the BWP configuration (through RRC signaling). In some implementations, the CORESET configuration is pre-configured through system information (e.g., Remaining Minimum System Information). The CORESET configuration may include the following information to indicate the location of RBs and its periodicity: (1) a first symbol index: CORESET-start-symb; (2) contiguous time duration of the CORESET in number of symbols; (3) CORESET-time-duration; (4) a set of resource blocks in frequency domain: CORESET-freq-dom. When configured BWP 890A is activated by DCI #1, the UE may know how to receive the CORESET of configured BWP 890A.

It should be noted that in the implementation shown in FIG. 8A, default BWP 880A and configured BWP 890A have no overlapping portion in time domain. That is, in component carrier 800A, there is only one active BWP at any given time. On or before the UE switching to configured BWP 890A, default BWP 880A is de-activated.

Figure 8B:
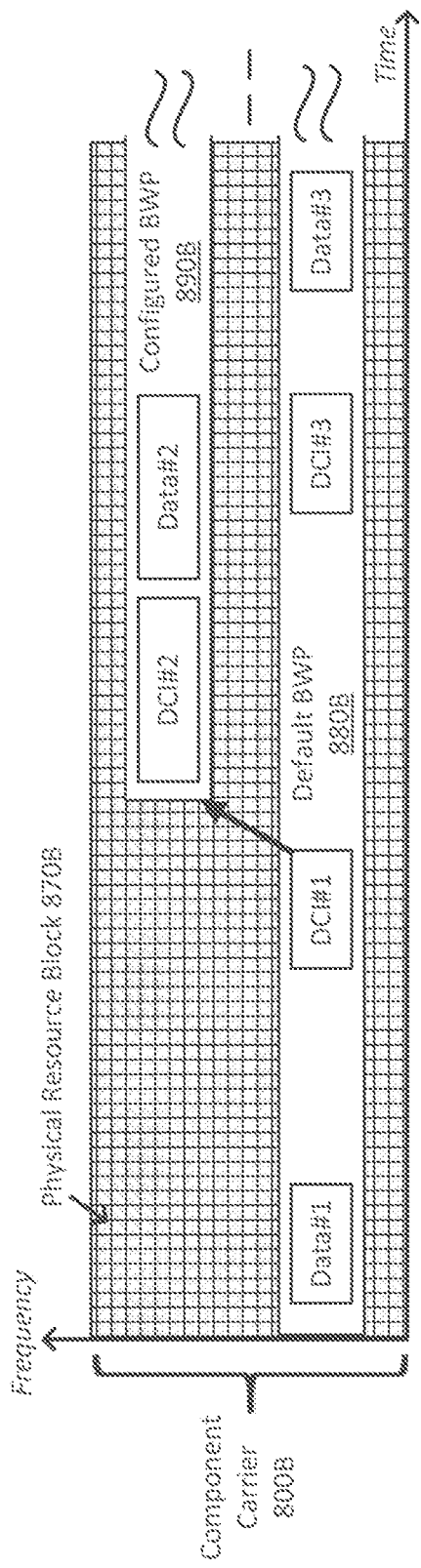
FIG. 8B is a diagram showing a BWP activation procedure using DCI, in accordance with an exemplary implementation of the present application.

FIG. 8B is a diagram showing a BWP activation procedure using DCI, in accordance with an exemplary implementation of the present application. As shown in FIG. 8B, component carrier 800B includes a plurality of physical resource blocks 870B. A cell may transmit (e.g., broadcast) packets based on the default BWP 880B to one or more UEs in its coverage area. In one implementation, the cell may transmit to a UE, in default BWP 880B, DCI message #1 (DCI #1), where DCI #1 includes a BWP index that corresponds to configured BWP 890B, and a BWP activation instruction to activate configured BWP 890B. When the UE receives DCI #1 in default BWP 880B, the UE decodes DCI #1 to retrieve the BWP index and the activation instruction. The UE may activate the configured BWP 890B. Then, the UE may transmit/receive packets continuously based on the PHY composition of configured BWP 890B.

It should be noted that in the implementation shown in FIG. 8B, default BWP 880B and configured BWP 890B may be simultaneously active in time domain. That is, after the UE activates the configured BWP 890B, default BWP 880B may remain active simultaneously with configured BWP 890B in component carrier 800B, as shown in FIG. 8B.

Figure 9A:
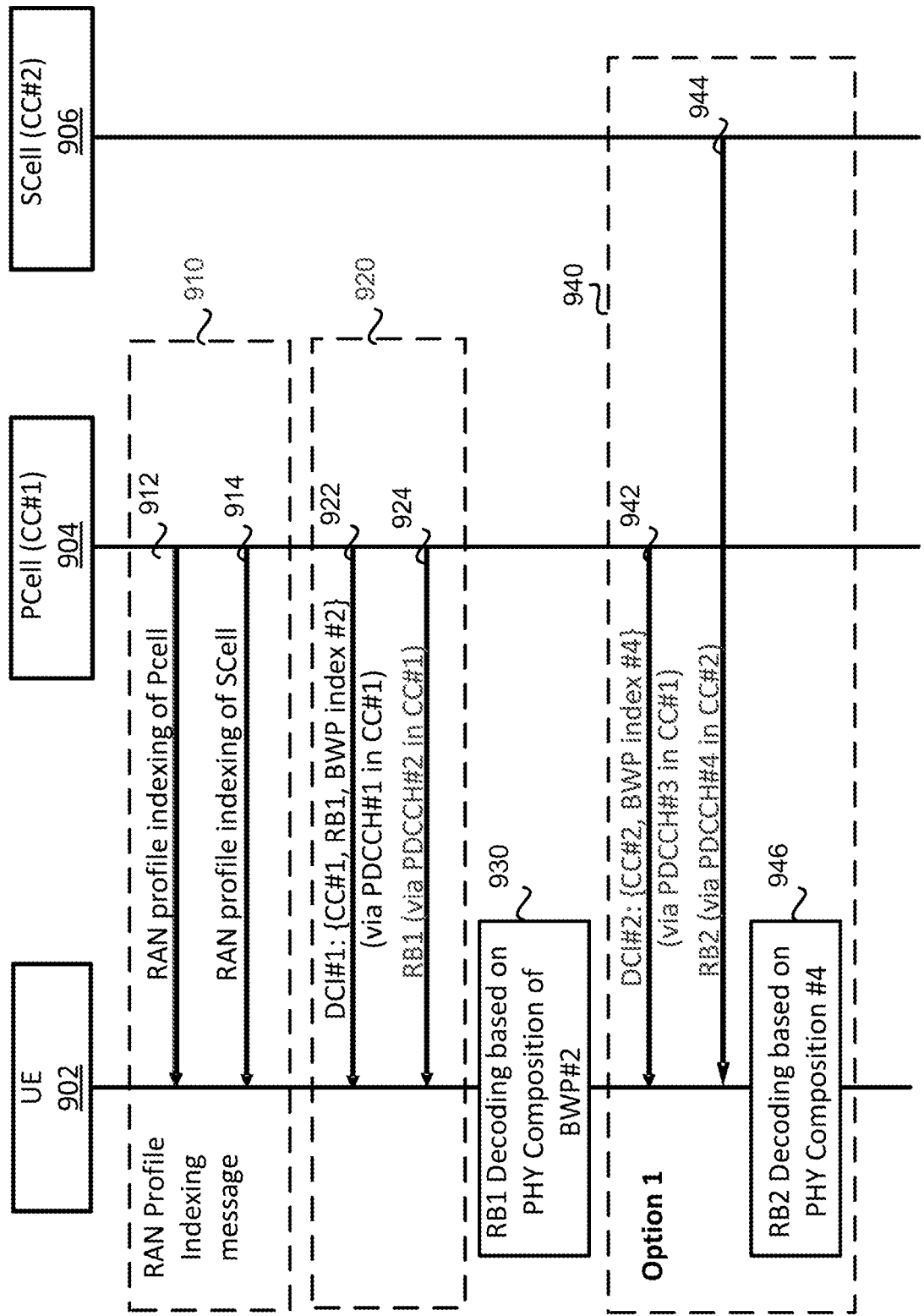
FIG. 9A is a diagram illustrating a method of a RAN profile index provision under carrier aggregation (CA), in accordance with an exemplary implementation of the present application.

FIG. 9A is a diagram illustrating a method of a RAN profile index provision under carrier aggregation (CA), in accordance with an exemplary implementation of the present application. As shown in FIG. 9A, Primary Cell (PCell) 904 and at least one Secondary Cell (SCell) 906 when the CA is configured/activated. PCell 904 and SCell 906 are operated on CC #1 and CC #2, respectively, in the frequency domain. According to CA specifications, control signaling of UE 902 may be provided by PCell 904. In some implementations, radio resource allocation of SCell 906 may be configured by a PDCCH of PCell 904. In some implementations, radio resource allocation of SCell 906 may be configured by a PDCCH of SCell 906.

As shown in FIG. 9A, in the present implementation, PCell 904 and the at least one SCell 906 may have different RAN profile indices (e.g., BWP indices) and mappings (RAN profile indexing) for their respective PHY compositions (e.g., BWP configurations). In the present implementation, in action 910, PCell 904 provides RAN profile indexing of PCell 904 to UE 902 (e.g., by system information) in action 912. PCell 904 provides RAN profile indexing of SCell 906 to UE 902 in action 914, for example, by RRC signaling. Therefore, in the RRC signaling, PCell 904 may provide SCell 906's SCell ID and the corresponding RAN profile indexing of SCell 906. Each of SCells 906 may be indicated with an individual RAN profile indexing.

In some implementations, PCell 904 may provide the RRC signaling for RAN profile indexing with the configuration of SCell 906. The RAN profile indexing of SCell 906 is still valid even SCell 906 has been deactivated and then be re-activated by PCell 904. Therefore, PCell 904 does not need to re-provide RRC signaling for the RAN profile indexing of SCell 906, when SCell 906 is re-activated by PCell 904.

In the present implementation, PCell 904 may also provide RRC signaling with the activation/deactivation of SCell 906. In the present implementation, the indicated RAN profile indexing may be invalid when SCell 906 is deactivated. In the present implementation, the RAN profile indexing of PCell 904 may be applied to SCell 906, when a valid RAN profile indexing of SCell 906 is not indicated by PCell 904.

As shown in FIG. 9A, after providing the RAN profile indexing message in action 910, PCell 904 in action 922 (of action 920) transmits to UE 902 a DCI message (DCI #1) in a component carrier (CC #1) via a PDCCH (PDCCH #1), where the DCI message includes the resource allocation of PCell 904 (e.g., RB1) and the corresponding BWP index (e.g., BWP index #2) which corresponds to one of the plurality of sets of PHY compositions (with a corresponding BWP configuration) of PCell 904 (e.g., BWP configuration #2).

In action 924 (of action 920), PCell 904 transmits data/control signaling to UE 902 on RB1 in a component carrier via a PDCCH (e.g., via PDCCH #2 in CC #1) based on BWP configuration #2. In action 930, the UE 902 decodes RB1 based on the PHY composition of BWP configuration #2 (e.g., BWP #2). In one implementation, RB1 may be located in the CORESET on BWP #2. PCell 904 may not indicate the location of RB1 explicitly in action 922. Instead, UE 902 may implement blind decoding in action 930 based on the CORESET configuration of the BWP configuration corresponding to BWP index #2, thus the resource allocation of RB1 may not be provided in action 922.

In action 940, for the resource allocation of SCell 906, in some implementations, in action 942, PCell 904 transmits to UE 902 a DCI message (DCI #2) in a component carrier (CC #1) via a PDCCH (PDCCH #3), where the DCI message includes the resource allocation of SCell 906 (e.g., RB2 in CC #2) and the corresponding BWP index (e.g. BWP index #4) that corresponds to one of the plurality of sets of PHY compositions (with a corresponding BWP configuration) of SCell 906 (e.g., BWP configuration #4). In action 944 (of action 940), SCell 906 transmits data/control signaling to UE 902 on RB2 in a component carrier via a PDCCH (e.g., via PDCCH #4 in CC #2) based on BWP configuration #4. In action 946, the UE 902 decodes RB2 based on BWP index #4, which corresponds to BWP configuration #4 of SCell 906. In one implementation, RB2 may be located in the CORESET on BWP #4. SCell 906 may not need to indicate the location of RB2 explicitly in action 942. Instead, UE 902 may implement blind decoding in action 946 based on the CORESET configuration of the BWP configuration corresponding to BWP index #4, thus the resource allocation of RB2 may not be provided in action 942.

Figure 9B:
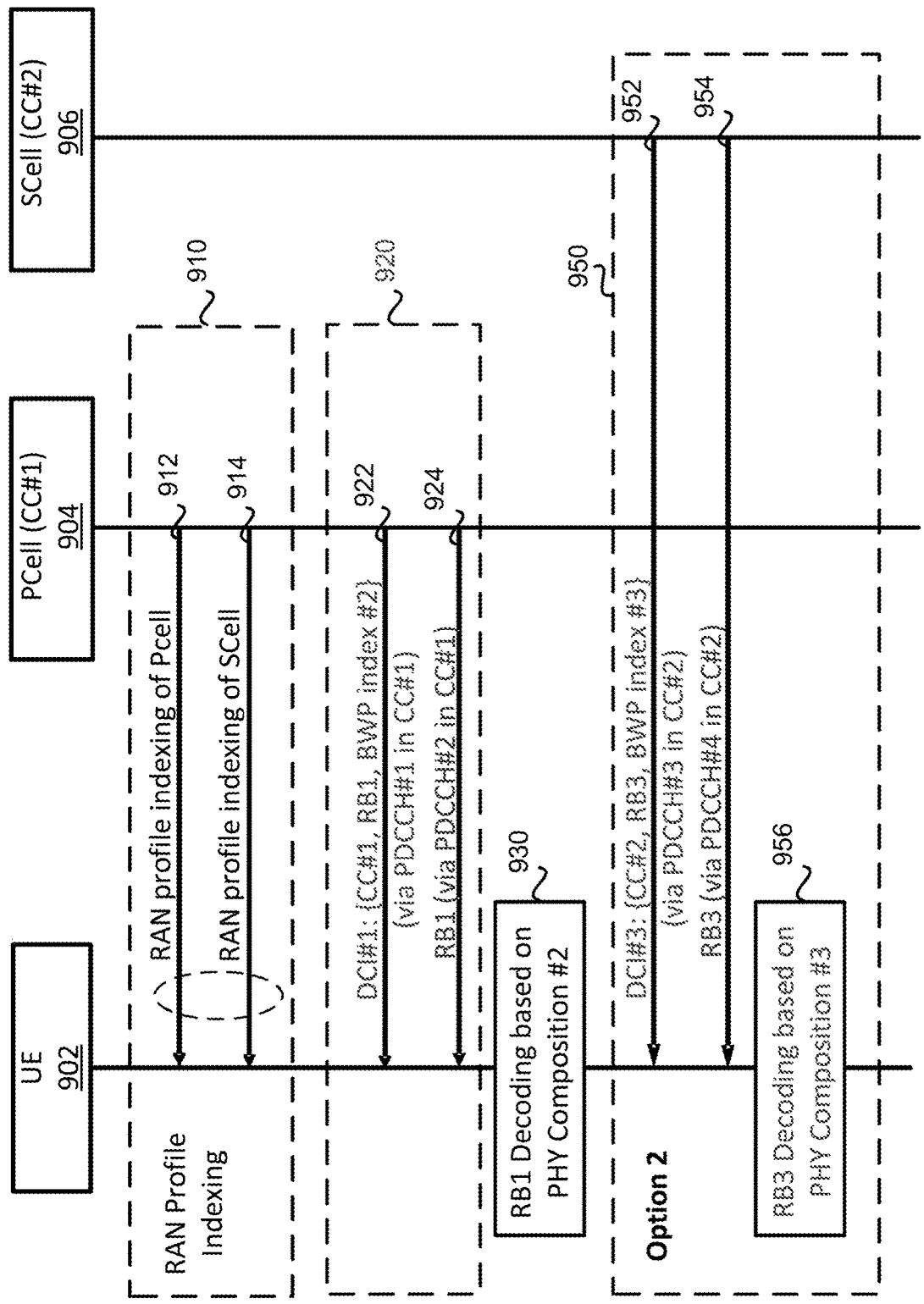
FIG. 9B is another diagram illustrating a method of a RAN profile index provision under carrier aggregation (CA), in accordance with an exemplary implementation of the present application.

FIG. 9B is a diagram illustrating a method of a RAN profile index provision under carrier aggregation (CA) of an exemplary implementation of the present application. In FIG. 9B, actions 912, 914, 920, 922, 924, and 930 may be substantially similar to actions 912, 914, 920, 922, 924, and 930, respectively, in FIG. 9A.

As shown in FIG. 9B, for the resource allocation of SCell 906, in action 952, SCell 906 transmits to UE 902 a DCI message (DCI #3) in a component carrier (CC #2) via a PDCCH (PDCCH #3), where the DCI message includes the resource allocation of SCell 906 and the corresponding BWP index (e.g., BWP index #3) that corresponds to resource block allocation information (e.g., RB3 in CC #2) which corresponds to one of the plurality of sets of PHY compositions (with a corresponding BWP configuration) of SCell 906 (e.g., BWP configuration #3). In action 954, SCell 906 transmits data/control signaling to UE 902 on RB3 in CC #2 via PDCCH #4. In action 956, the UE 902 decodes RB3 on PDCCH #4 of SCell 906 based on BWP index #3, which corresponds to PHY composition of BWP configuration #3 (e.g., BWP #3) of SCell 906.

In some implementations, in Long Term Evolution (LTE) architecture, an eNB may provide a default RAN profile indexing to the UE 902 in the carrier aggregation. The default RAN profile indexing to different CC may be decided independently. The eNB may decide the (default) RAN profile indexing of each cell in response to capability of the UE 902.

According to implementations of the present application, a DCI message may include a Bandwidth Part indicator field (BIF). Table 1 below shows that each BIF represents a different BWP index (e.g., RAN profile index).

TABLE 1

BIF and the Corresponding BWP indices

| BIF | Note |
|---|---|
| 00 | BWP index #0 |
| 01 | BWP index #1 |
| 10 | BWP index #2 |
| 11 | BWP index #3 |

Figures 10A, 10B:
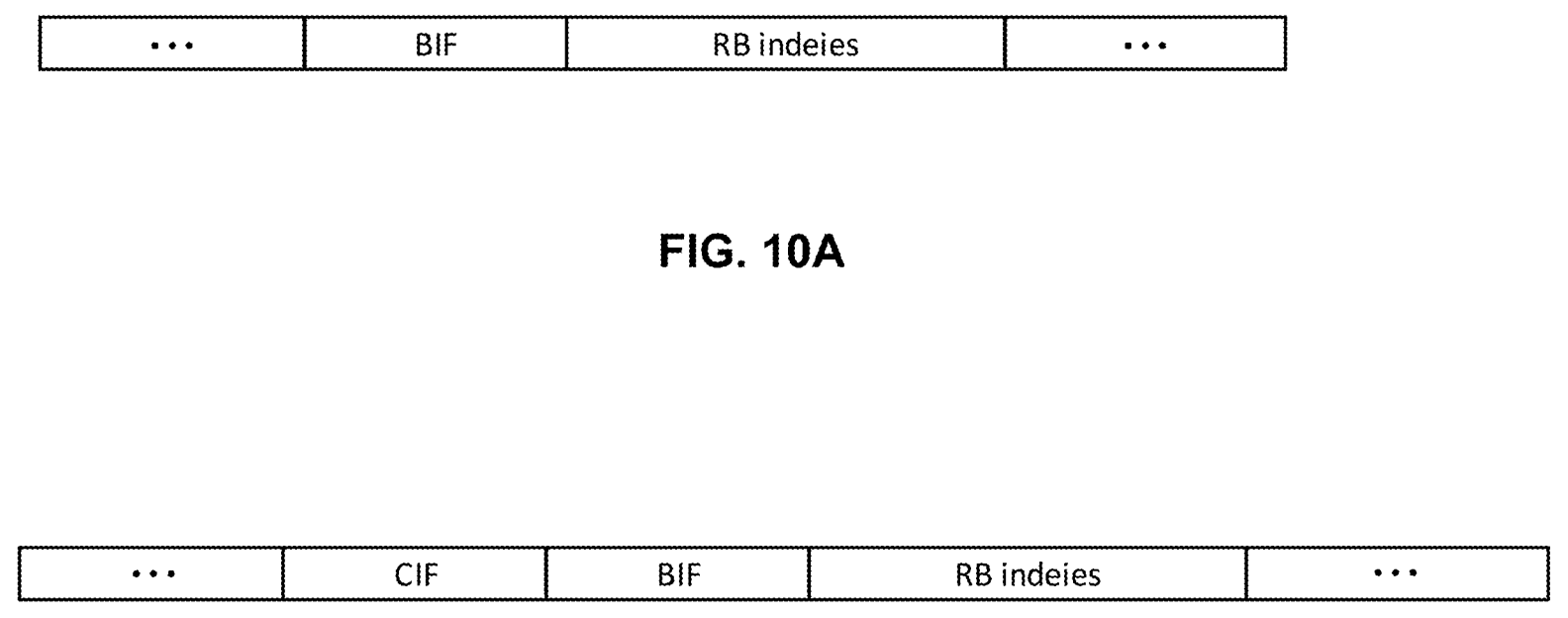

FIG. 10A is a diagram illustrating a DCI format having a BIF, in accordance with an exemplary implementation of the present application. After receiving the DCI, the UE may know which BWP is to be activated/de-activated based on the received BIF. For example, an inactive BWP may be activated, when the UE receives the corresponding BIF in a DCI. Also, an active BWP may be de-activated if the UE receives the corresponding BIF in a DCI.

FIG. 10B is a diagram illustrating a DCI format having a BIF and a Carrier indicator filed (CIF), in accordance with an exemplary implementation of the present application. The DCI format shown in FIG. 10B may be applied for cross carrier BWP activation/de-activation. CIF is for the UE to recognize which cell that the RAN wants to indicate (e.g. SCell #1). The CIF in implementations of the present application may be substantially similar to CIF in the LTE protocols. So, after receiving the DCI, for example, having a CIF (e.g., pointing to SCell #1) and a BIF (e.g., BIF=01), the UE may know that it needs to activate/de-activate BWP configuration #1 in SCell #1. Also, it should be noted that, since each cell may have different BWP configurations, the BWP configurations of BWP index #1 in SCell #1 may be different from the BWP configuration of BWP index #1 in other serving cells (if any).

Figure 11A:
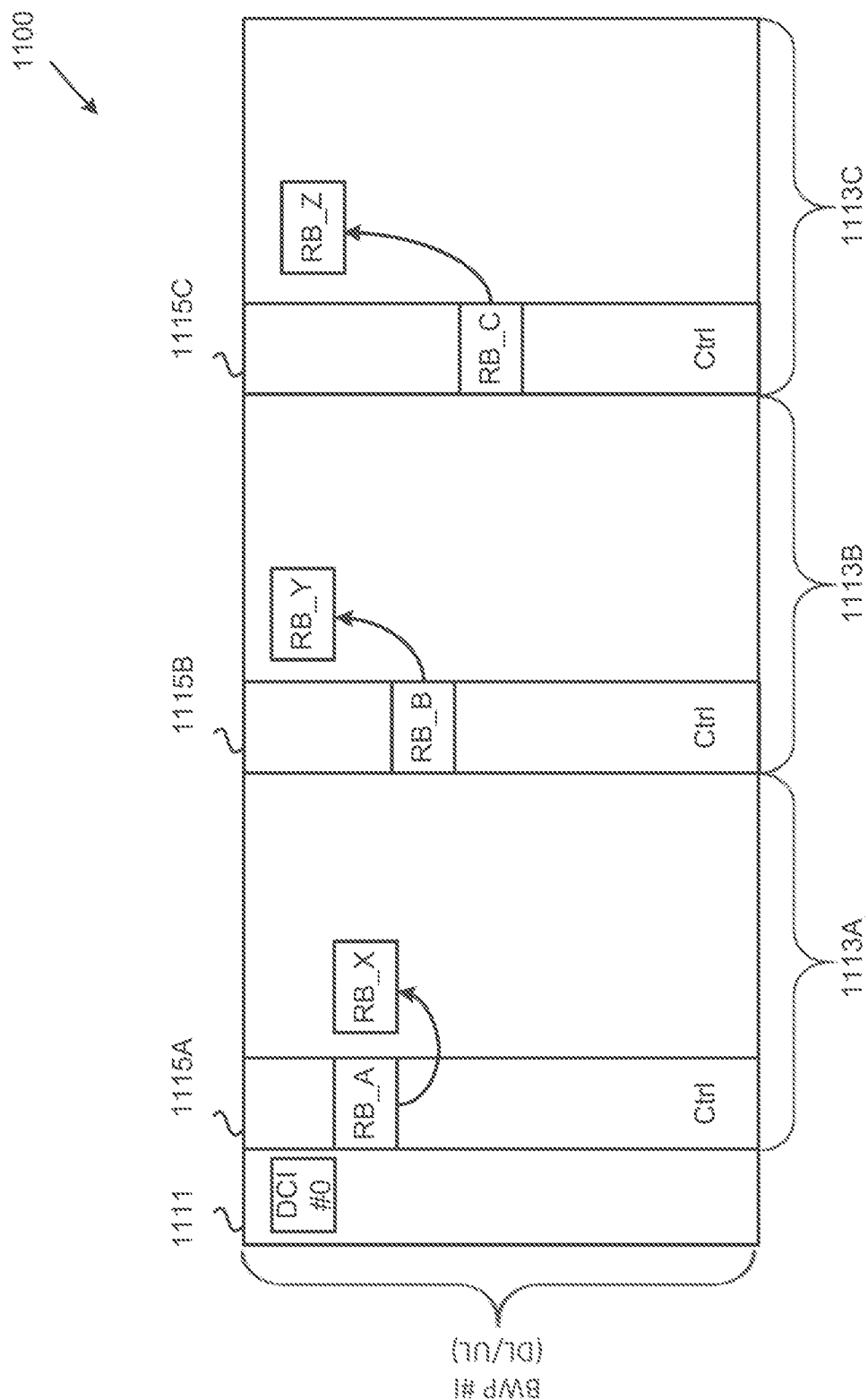
FIG. 11A is a schematic diagram of a frame structure of a two-level DCI with multiple resource block allocations, in accordance with an exemplary implementation of the present application.

FIG. 11A is a schematic diagram of a frame structure of a two-level DCI with multiple resource block allocations, in accordance with an exemplary implementation of the present application. As shown in FIG. 11A, the frame structure of sub-frame 1100, provided by a cell, includes PDCCH 1111, a plurality of mini-slots 1113A, 1113B, and 1113C, and control search space 1115A, 1115B, and 1115C in mini-slots 1113A, 1113B, and 1113C, respectively. In the present implementation, PDCCH 1111 is at the beginning of the sub-frame 1100 and an active UE (not shown) is acknowledged to monitor PDCCH 1111 in sub-frame 1100.

As shown in FIG. 11A, in the present implementation, DCI #0 in PDCCH 1111 includes one BWP index which corresponds to one BWP configuration. Then, after decoding the BWP index successfully, a UE may retrieve the corresponding PHY composition, which also includes the CORESET configuration (e.g., the configuration of mini-slots 1313A, 1113B, and 1113C and the control (ctrl) search space 1115A, 1115B, and 1115C in each mini-slot, respectively) of the indicated BWP. Then, based on the CORESET configuration, the UE may search the control (ctrl) search space in the mini-slots to find out and decode RB_A, RB_B and RB_C successfully (e.g., through blind decoding). In some implementations, DCI #0 is scrambled by a specific Radio Network Temporary Identifier (RNTI). Therefore, in some implementations, the UE may decode control signals based on the specific RNTI. After decoding DCI #0 successfully, the UE may retrieve the structure of sub-frame 1100, which includes the number of mini-slots 1113A, 1113B, and 1113C and the time span (e.g., the number of symbols in time domain) for each of mini-slots 1113A, 1113B, and 1113C respectively. In addition, the UE may know the control search space of each mini-slot, so that the UE may also find out RB_A, RB_B, and RB_C in each mini-slot successfully. In some implementations, PDCCH 1111 includes resource allocations of control channel in each of mini-slots 1113A, 1113B, and 1113C.

Figure 11B:
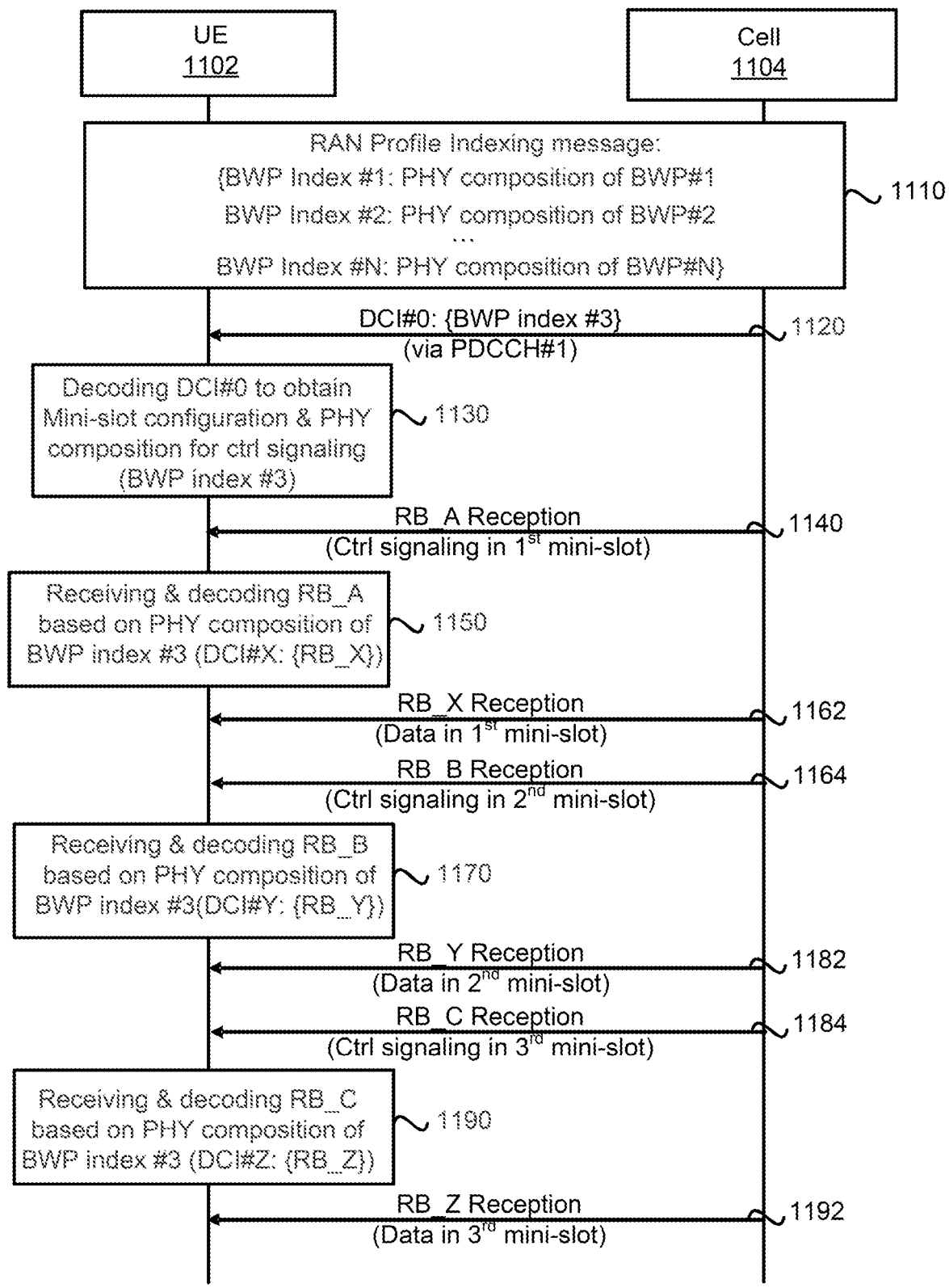
FIG. 11B is a diagram illustrating a method of a two-level DCI with multiple resource block allocations, in accordance with an exemplary implementation of the present application.

FIG. 11B is a diagram illustrating a method of a two-level DCI with multiple resource block allocations, in accordance with an exemplary implementation of the present application. As shown in FIG. 11B, in action 1110, cell 1104 transmits (e.g., periodically or aperiodically) a RAN profile indexing message to UE 1102 within its cell coverage, for example, using a dedicated control signaling (e.g. RRC signaling). The RAN profile indexing message at least contains information on a plurality of sets of RAN parameters, each set of the RAN parameters corresponds to the settings (e.g., BWP configuration) of a specific BWP. The RAN profile indexing message also contains a plurality of BWP indices corresponding to the plurality of sets of RAN parameters. Each of the plurality of sets of RAN parameters corresponds to a specific PHY composition. The PHY compositions can each map a BWP index that corresponds to a specific BWP configuration of a BWP. UE 1102, upon receiving the RAN profile indexing message, stores the RAN profile indexing information having the BWP configurations (e.g., PHY compositions) and the corresponding BWP indices for subsequent transmission/reception operations. It should be noted that cell 1104 may be an NR eNB/gNB in an NR communication network or an eNB in a LTE/LTE-A communication network.

In action 1120, cell 1104 transmits to UE 1102 using a DCI message (DCI #0) in a PDCCH (PDCCH #1), where the DCI message may include a BWP index (e.g., BWP index #3) that corresponds to one BWP configuration, which also includes the configuration of mini-slots. For example, when cell 1104 decides to apply the PHY composition of BWP configuration #3 in a PDSCH for DL transmission, cell 1104 may transmit the DCI message, containing information indicating BWP index #3, to UE 1102 via PDCCH #1.

In action 1130, UE 1102 decodes the DCI #0 for obtaining the configurations of the mini-slots and the PHY compositions for control signaling.

In action 1140, cell 1104 transmits RB_A in the control search space 1115A in mini-slot 1113A.

In action 1150, UE 1102 obtains a control message RB_A and decodes the control message RB_A based on BWP index #3 (corresponding to PHY composition of BWP configuration #3, BWP #3) for obtaining DCI #X. In the present implementation, the DCI #X includes resource allocation of RB_X. The RB_X may also be encoded and multiplexed based on the PHY composition of BWP configuration #3.

In action 1162, cell 1104 transmits RB_X having DL data in mini-slot 1113A to UE 1102. In action 1164, cell 1104 transmits RB_B in the control search space 1115B in mini-slot 1113B to UE 1102.

In action 1170, UE 1102 obtains a control message RB_B and decodes the control message RB_B based on BWP index #3 (corresponding to PHY composition of BWP configuration #3, BWP #3) for obtaining DCI #Y. In the present implementation, the DCI #Y includes resource allocation of RB_Y. The RB_Y may also be encoded and multiplexed based on the PHY composition of BWP configuration #3.

In action 1182, cell 1104 transmits to UE 1102 RB_Y having DL data in mini-slot 1113B. In action 1184, cell 1104 transmits RB_C to UE 1102 in the control search space 1115C in mini-slot 1113C.

In action 1190, UE 1102 obtains a control message RB_C and decodes the control message RB_C based on BWP index #3 (corresponding to PHY composition of BWP configuration #3, BWP #3) for obtaining DCI #Z. In the present implementation, the DCI #Z includes resource allocation of RB_Z. The RB_Z may also be encoded and multiplexed based on the PHY composition of BWP configuration #3. In action 1192, cell 1104 transmits to UE 1102 RB_Z having DL data in mini-slot 1113C.

Consequently, UE 1102 can follow the indicated RAN profile indexing to respectively decode the corresponding RB_X, RB_Y, RB_Z based on the PHY composition of BWP configuration #3. In the present implementation, RB_X, RB_Y, RB_Z include data that cell 1104 delivers to UE 1102 in mini-slots 1113A, 1113B, and 1113C, respectively.

It should be noted that, the mini-slot configurations, which are part of a CORESET configuration, are pre-configured in the PHY composition. Thus, the UE may retrieve the mini-slot configuration after obtaining BWP index #3 is delivered by cell 1104 in DCI #0. It should be noted that in blocks 1150, 1170, and 1190, since RB_X, RB_Y, and RB_Z are in the same BWP activated by BWP index #3, and since each of DCI #X, DCI #Y, and DCI #Z does not specify a RAN profile index, RB_X, RB_Y, and RB_Z are decoded based on BWP Index #3 corresponding to PHY composition #3, which is transmitted from cell 1104 to UE 1102 in DCI #0.

It should be noted that the CORESET configuration may be pre-configured in one BWP configuration (the ctrl fields in one sub-frame). When the BWP is activated, the UE may know where to find the CORESET (e.g., control fields in each mini-slot). So, the UE may find RB_A, RB_B, and RB_C in the CORESETs (e.g., through blind decoding). Then, the UE may know to receive RB_X, RB_Y, and RB_Z, in subsequent receptions. It is noted that the methods can be applied to DL, UL, and SL.

For uplink (UL) transmission, both UL Grant Free (GF) transmission (Type 1) and UL Semi-Persistent-Scheduling (SPS) transmission (Type 2) are supported in NR. For Type 1–UL GF transmission, gNB may provide GF resource to UE through dedicated signaling (e.g., RRC signaling). The GF resource can be considered a group of resource blocks, which may be shared among UEs. In addition, the GF resources may appear periodically. For Type 2—UL SPS transmission, gNB may provide SPS resource to UE through RRC signalings. However, it is worthy to note that, while the RRC signalings may configure the periodicity of the SPS resource, gNB may need to activate a SPS resource through DCI, which includes the location of resource blocks and further configuration (e.g., modulation and coding scheme, and etc.).

For Type 1—UL GF transmission, a UE can apply GF resource after receiving RRC signaling which configures the GF resource. For Type 2—UL SPS transmission, a UE needs to use a DCI to activate/de-activate a SPS resource, since the RAN may provide the resource location and size only through the DCI.

Figure 12:
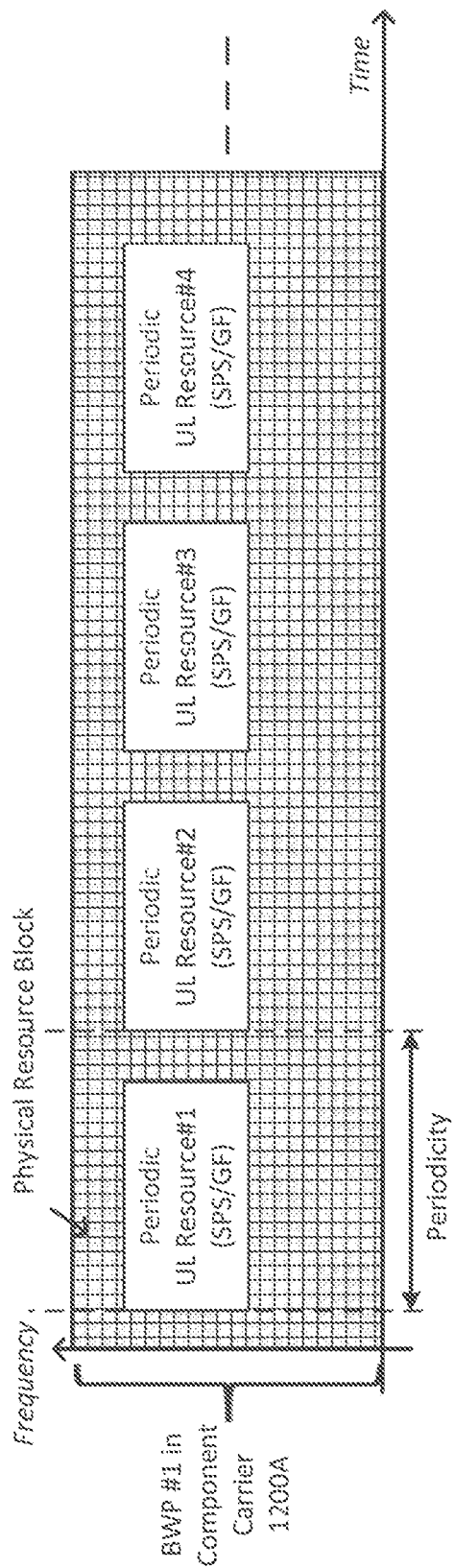
FIG. 12 is a diagram illustrating SPS/GF radio resources in a BWP, in accordance with an exemplary implementation of the present application.

FIG. 12 is a diagram illustrating SPS/GF radio resources in a BWP, in accordance with an exemplary implementation of the present application. As shown in FIG. 12, BWP #1 in component carrier 1200A includes SPS or GF UL resources which may be periodic UL resources for a US to transmits UL packets without dynamic grant. With the introduction of BWP switching/BWP activation, the impact of BWP on Type 1 and Type 2 resources will be discussed below.

In one implementation, a BWP may be configured with one or more Type 1—GF resources, where all of the configured Type 1—GF resources may be activated automatically when the base station actives one BWP through a DCI. In addition, all of the configured Type 1—GF resources may not be activated with the de-activation of BWP. It is also noted that a UE may keep the configuration of de-activated Type 1—GF resource when the BWP is de-activated.

In another implementation, each cell may be configured with one or more Type 2—SPS resources. For each Type 2—SPS configuration, the UL grant and the PHY composition of resource may vary with the BWP activation/de-activation. Thus, RAN may change the BWP index of the SPS for UE to transmit UL packet based on different BWP configurations.

Figure 13A:
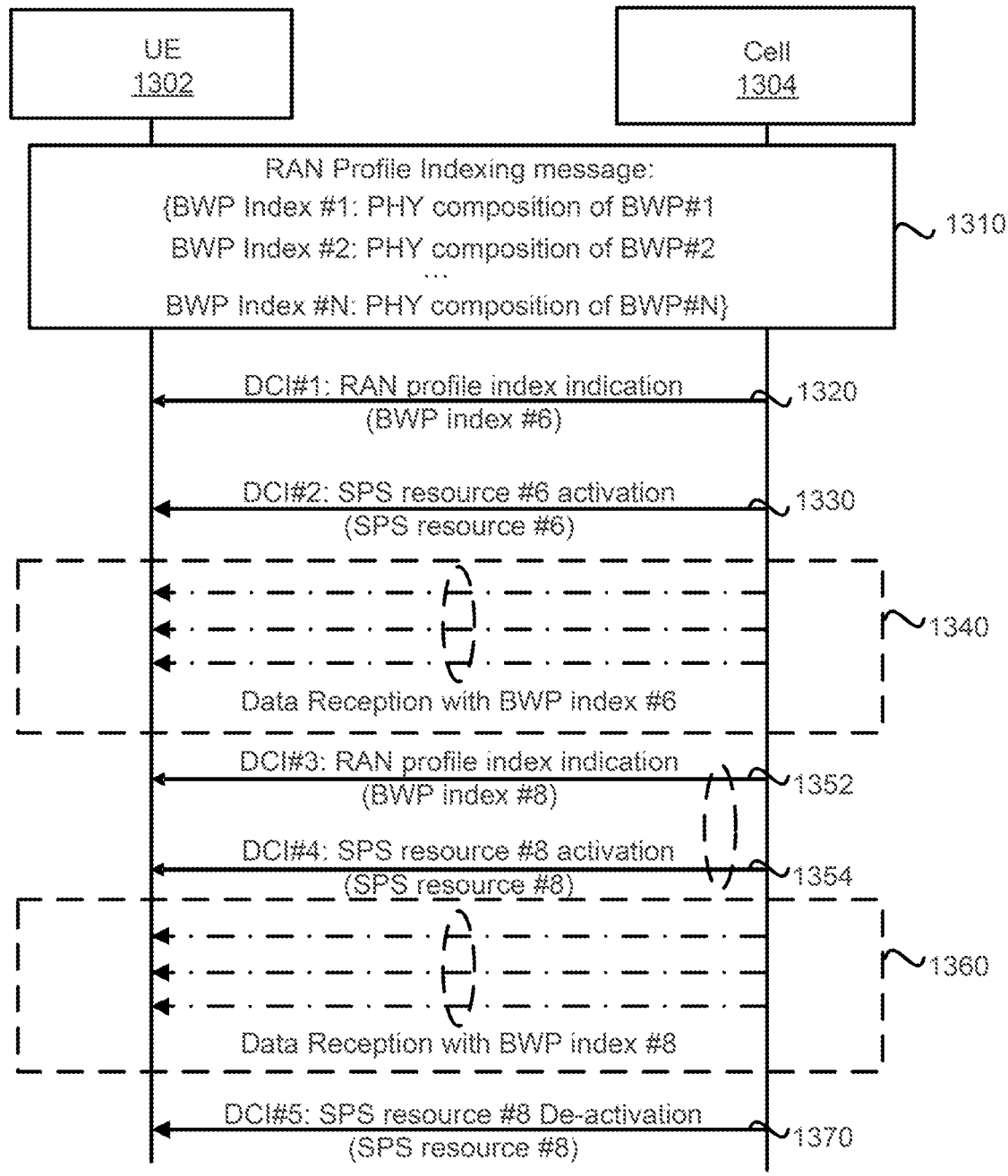
FIG. 13A is a diagram illustrating a method of RAN profile index provision with Semi-Persistent-Scheduling (SPS) resource, in accordance with an exemplary implementation of the present application.
Figure 13B:
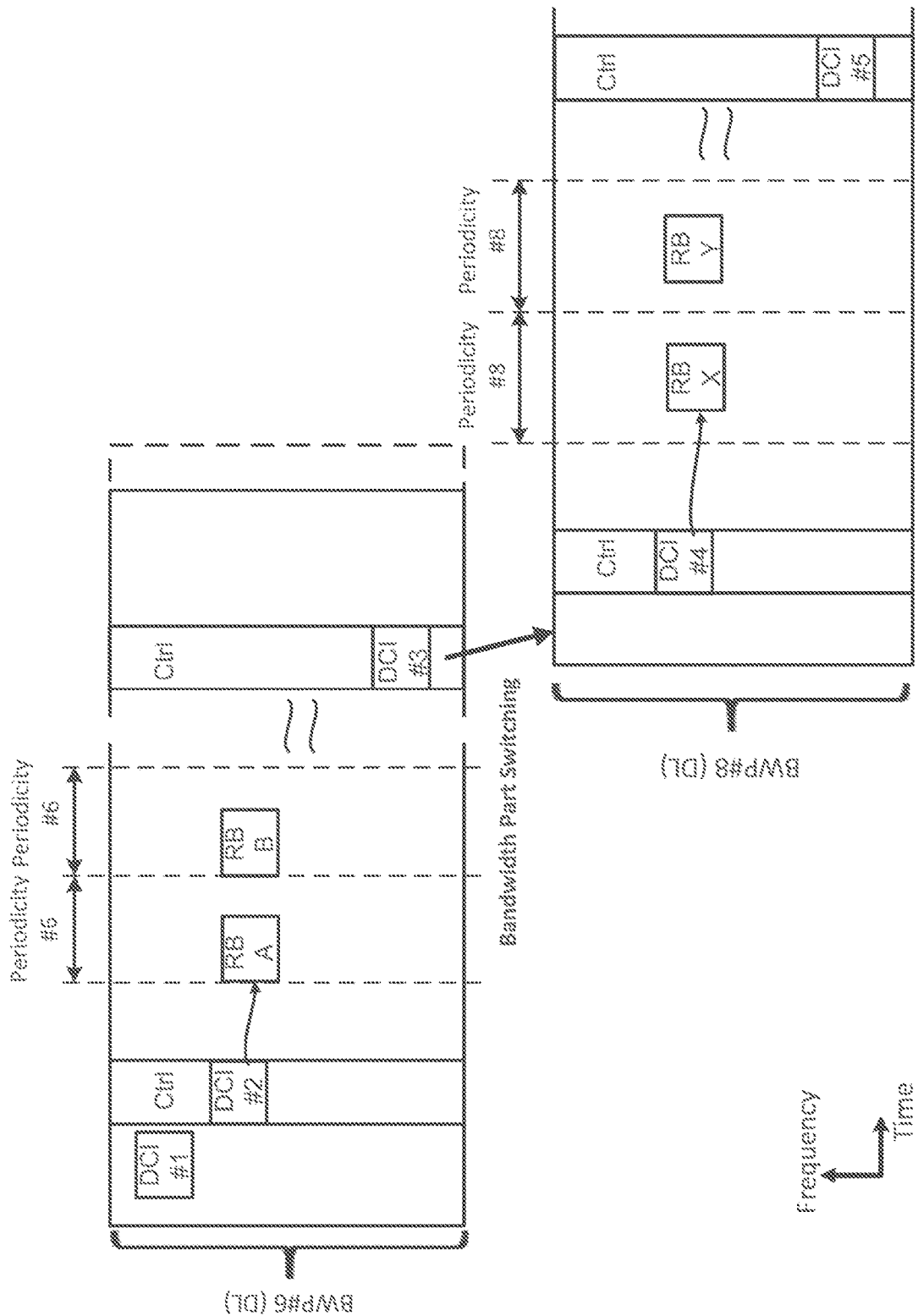
FIG. 13B a diagram illustrating DL SPS resource reception, in accordance with an exemplary implementation of the present application

FIG. 13A is a diagram illustrating a method of RAN profile index provision with Semi-Persistent-Scheduling (SPS) resource, in accordance with an exemplary implementation of the present application. FIG. 13B a diagram illustrating DL SPS resource reception, in accordance with an exemplary implementation of the present application.

As shown in FIGS. 13A and 13B, in action 1310, cell 1304 transmits a RAN profile indexing message to UE 1302 within its cell coverage, for example, using a dedicated control message (e.g., RRC signaling). The RAN profile indexing message at least contains information on a plurality of sets of RAN parameters, each set of the RAN parameters corresponds to the settings (e.g., BWP configuration) of a specific BWP. The RAN profile indexing message also contains a plurality of BWP indices corresponding to the plurality of sets of RAN parameters. Each of the plurality of sets of RAN parameters corresponds to a specific PHY composition. The PHY compositions can each map to a BWP index that corresponds to a specific BWP configuration of a BWP. UE 1302, upon receiving the RAN profile indexing message, stores the BWP configurations (e.g., PHY compositions) and the corresponding BWP indices for subsequent transmission/reception operations. It should be noted that, in the present implementation, cell 1304 may be an NR eNB/gNB in an NR communication network or an eNB in a LTE/LTE-A communication network.

In action 1320, cell 1304 transmits a DCI message (DCI #1) to UE 1302, where the DCI message may include the configurations of the mini-slots, and an BWP index (e.g., BWP index #6) that corresponds to one of the plurality of sets of PHY compositions corresponding to a specific BWP configuration (e.g., BWP #6). For example, when cell 1304 decides to apply the PHY composition of BWP configuration #6 in a PDSCH for DL transmission, cell 1304 may transmit the DCI message, containing information indicating BWP index #6, to UE 1302. Cell 1304 may also configure the periodicity (periodicity #6 in FIG. 13B) of the SPS resource, for example, within the BWP configuration #6.

In action 1330, cell 1304 transmits a DCI message (DCI #2) to UE 1302, where the DCI message includes the location of resource blocks (e.g., SPS resource #6) and other configurations (e.g., modulation and coding scheme, and etc.) of the SPS resources needed to activate the SPS packet reception in BWP #6.

In action 1340, UE 1302 receives resource blocks (e.g., RB_A, RB_B, and etc.) and decodes the resource blocks using BWP index #6 corresponding to PHY composition of BWP configuration #6 configured by cell 1304. As shown in FIG. 13B, RB_A and RB_B and the subsequent continuous DL packet transmissions before the reception of DIC #3 are transmitted periodically according to the periodicity of BWP #6.

In action 1352, cell 1304 transmits a DCI message (DCI #3) to UE 1302, where the DCI message with an BWP index (e.g., BWP index #8) that corresponds to another one of the plurality of sets of PHY compositions for a specific BWP configuration (e.g., BWP #8). Upon decoding DCI #3, UE 1302 switches from BWP #6 to BWP #8, as BWP index #8 (hence BWP index #8) was indicated in DCI #3.

In action 1354, cell 1304 transmits a DCI message (DCI #4) to UE 1302, where the DCI message includes the location of resource blocks (e.g., SPS resource #8) and other configurations (e.g., modulation and coding scheme, and etc.) of the SPS resources needed to activate the SPS packet reception in BWP #8.

In some implementations, the information in DCI #3 and DCI #4 may be merged in one DCI, such that UE 1302 can access SPS resources directly after the BWP switching. In some other implementations, one BWP may be configured with multiple SPS configurations. In such condition, each SPS configuration may be configured with a SPS index in each BWP. In addition, in DCI #4, Cell 1304 may include at least one SPS index in the DCI #4, so that UE 1302 may know which SPS configuration is activated by DCI #4.

In action 1360, UE 1302 receives resource blocks (e.g., RB_X, RB_Y, and etc.) and decodes the resource blocks using BWP index #8 corresponding to PHY composition of BWP configuration #8 configured by cell 1304. As shown in FIG. 13B, RB_X and RB_Y and the subsequent continuous DL packet transmissions before the reception of DIC #5 are transmitted periodically according to the periodicity of SPS configuration in BWP #8.

In action 1370, cell 1304 transmits a DCI message (DCI #5) to UE 1302, where the DCI message includes BWP index #8. Upon decoding DCI #5, UE 1302 knows to de-activate SPS packet reception in BWP #8.

It should be noted that although FIGS. 13A and 13B apply to DL SPS resource reception on the UE side, similar approach may be applicable to UL and sidelink SPS resource transmission.

Figure 14A:
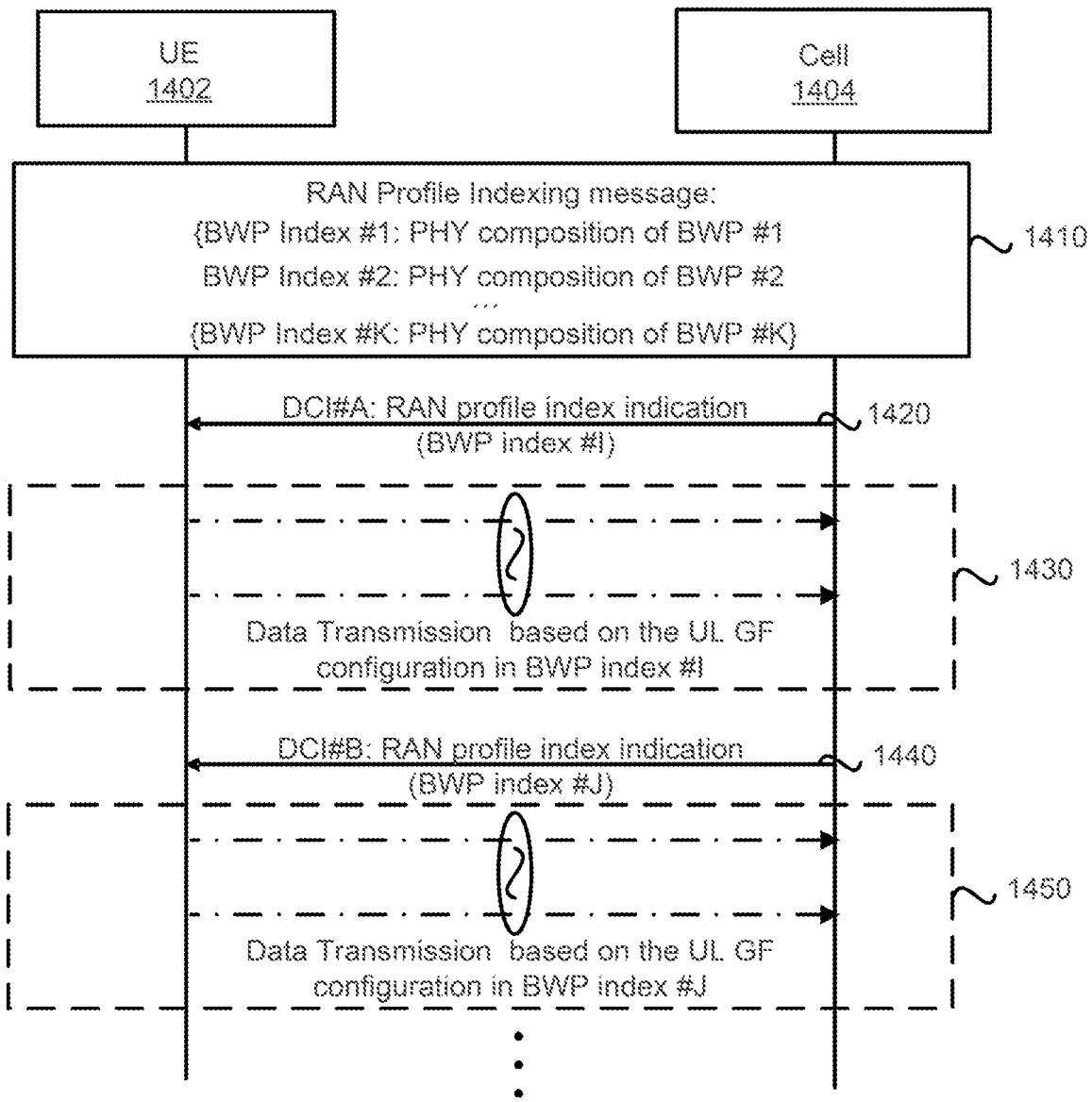
FIG. 14A is a diagram illustrating a method of RAN profile index provision with grant free (GF) resource transmission, in accordance with an exemplary implementation of the present application.
Figure 14B:
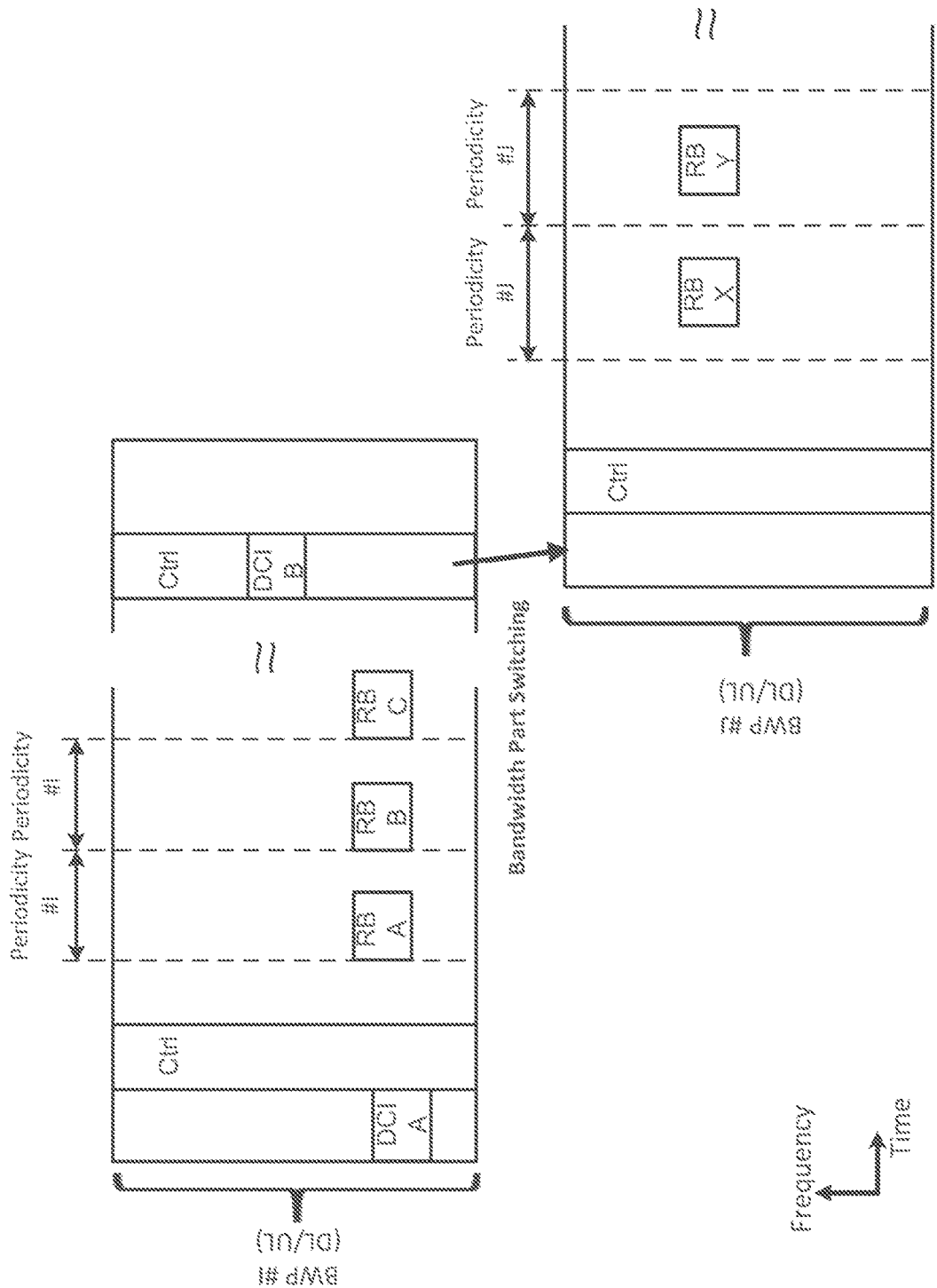
FIG. 14B is a diagram illustrating UL GF resource transmission, in accordance with an implementation of the present application.

FIG. 14A is a diagram illustrating a method of RAN profile index provision with grant free (GF) resource transmission, in accordance with an exemplary implementation of the present application. FIG. 14B is a diagram illustrating UL GF resource transmission, in accordance with an implementation of the present application.

As shown in FIGS. 14A and 14B, in action 1410, cell 1404 transmits a RAN profile indexing message to UE 1402 within its cell coverage, for example, using a dedicated control signaling (e.g. RRC signaling). The RAN profile indexing message at least contains information on RAN profile settings having a plurality of sets of RAN parameters, and a plurality of indices which are corresponding to The RAN profile indexing message at least contains information on a plurality of sets of RAN parameters, each set of the RAN parameters corresponds to the settings (e.g., BWP configuration) of a specific BWP. The RAN profile indexing message also contains a plurality of BWP indices corresponding to the plurality of sets of RAN parameters. Each of the plurality of sets of RAN parameters corresponds to a specific PHY composition. The PHY compositions can each map to a BWP index that corresponds to a specific BWP configuration of a BWP. UE 1402, upon receiving the RAN profile indexing message, stores BWP configurations (e.g., PHY compositions) and the corresponding BWP indices for subsequent transmission/reception operations. It should be noted that cell 1404 may include an NR eNB/gNB in an NR communication network or an eNB in a LTE/LTE-A communication network. In action 1420, cell 1404 transmits a DCI message (DCI #I) to UE 1402, where the DCI message may include a BWP index (BWP index #I) that corresponds to one of the plurality of sets of PHY compositions of a specific BWP configuration #I (e.g., BWP #I). For example, when cell 1404 may decide to have UE 1402 apply the PHY composition of BWP configuration #I for UL transmission, cell 1404 may transmit the DCI message, containing information indicating BWP index #I, to UE 1402. GF resource configuration and the periodicity of the GF resource are provided within the PHY composition corresponding to BWP configuration #I.

In action 1430, UE 1402 may transmit data to cell 1404 based on UL GF configuration in BWP index #I. As can be seen in FIG. 14B, the GF resources may appear periodically such that UE 1402 may transmit RB_A, RB_B, RB_C, and etc. to cell 1404 using the periodic GF resources in BWP #I.

In action 1440, cell 1404 transmits a DCI message (DCI #B) to UE 1402, where the DCI message includes an BWP index (BWP Index #J) that corresponds to one specific BWP configuration (BWP #J). Upon decoding DCI #B, UE 1402 switches from BWP #I to BWP #J, as BWP index #J was indicated in DCI #B. In one implementation, cell 1404 may provide GF resources to UE 1402 through a BWP configuration (e.g., in the configuration of BWP #J).

In action 1450, UE 1402 may transmit data to cell 1404 based on UL GF configuration in BWP index #J. As can be seen in FIG. 14B, the GF resources may appear periodically such that UE 1402 may transmit RB_X, RB_Y, and etc. to cell 1404 using the periodic GF resources in BWP #J.

It should be noted that although FIGS. 14A and 14B apply to UL GF resource transmission, similar approach may be applicable to DL GF resource transmission.

Figure 15:
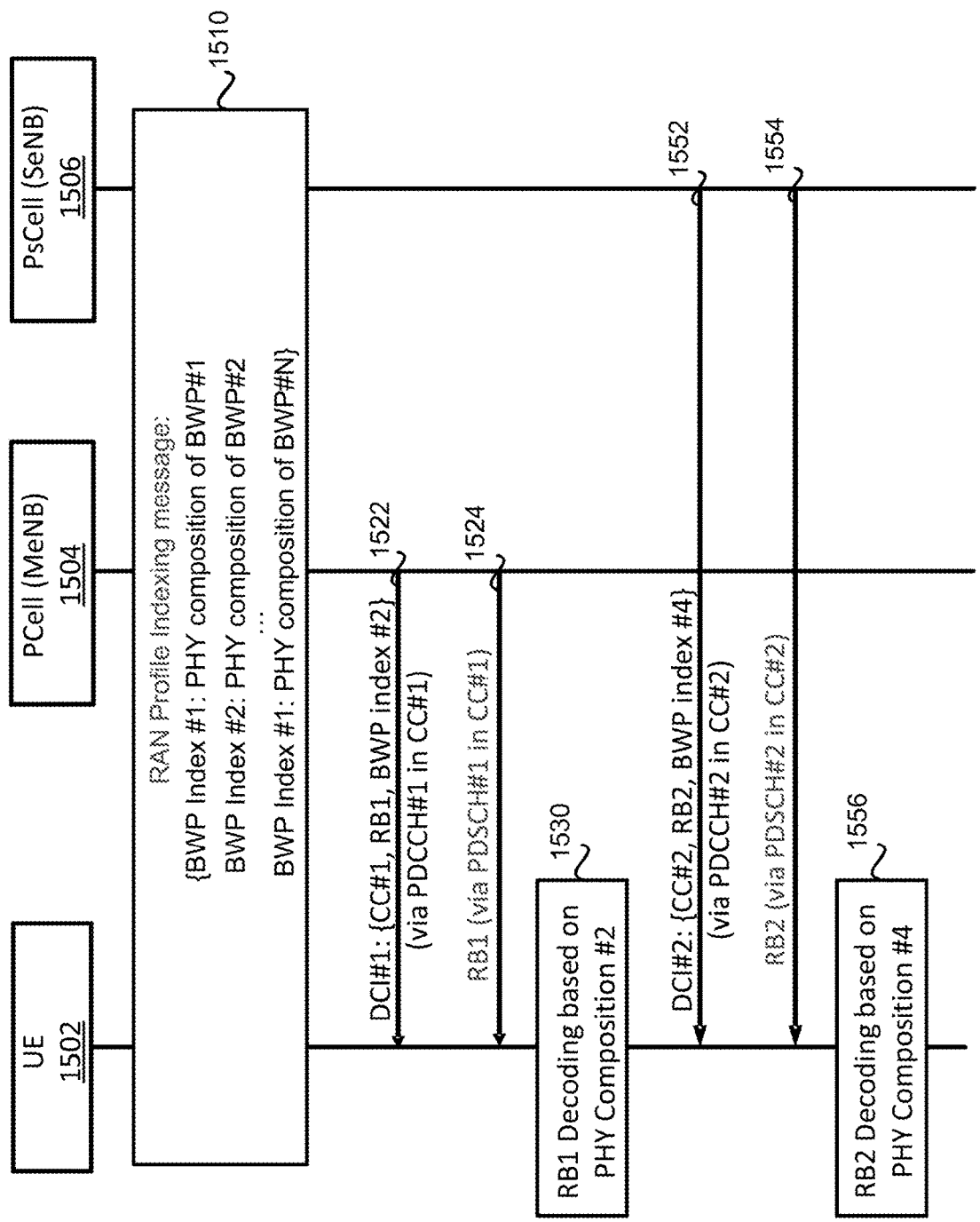
FIG. 15 is a diagram illustrating a method of a RAN profile index provision under dual-connectivity (DC), in accordance with an exemplary implementation of the present application.

FIG. 15 is a diagram illustrating a method of a RAN profile index provision under dual-connectivity (DC), in accordance with an exemplary implementation of the present application.

As shown in FIG. 15, in action 1510, PCell 1504 and PsCell 1506 may need to negotiate with UE 1502 for acquiring RAN profile indexing. In some implementations, PCell 1504 may have different RAN profile indexing from PsCell 1506. As shown in FIG. 15, in action 1522, PCell 1504 provides the resource allocation (e.g., RB 1) and the corresponding BWP index (e.g., BWP index #2) via PDCCH #1 in CC #1 to UE 1502 for DL resource allocation in PCell 1504. In action 1524, PCell 1504 transmits RB1 to UE 1502 via PDSCH #1 in CC #1. In action 1530, UE 1502 performs RB1 decoding in response to PHY composition of BWP #2.

Moreover, for the resource allocation of PsCell 1506, in action 1552, PsCell 1506 indicates the resource allocation of PsCell 1506 (e.g., RB2) and the corresponding BWP index (BWP index #4) via PDCCH #2 in CC #2. In action 1554, PsCell 1506 transmits RB2 to UE 1502 via PDSCH #2 in CC #2. Therefore, in action 1556, UE 1502 receives RB2 on the PDSCH #2 of PsCell 1506 in CC #2 (e.g. CC #2 acts as a PCC in SeNB) and then decodes RB2 in response to PHY composition of BWP #4 of PsCell 1506.

In some implementations, PCell 1504 and PsCell 1506 may broadcast the RAN profile indexing via system information. In some implementations, PCell 1504 and PsCell 1506 may unicast the RAN profile indexing via RRC signaling. In the present implementation, PsCell 1506 is required to acquire capability of UE 1502 for facilitating respective RAN profile indexing and scheduling.

Moreover, PCell 1504 and PsCell 1506 may need to negotiate with UE 1502 for acquiring RAN profile indexing. In some implementations, PCell 1504 may have different RAN profile indexing from PsCell 1506. Furthermore, in some implementations, PCell 1504 may relay RAN profile information of PsCell 1506 to UE 1502 and vice versa (i.e., relay capability information of UE 1502 to PsCell 1506), if PsCell 1506 does not negotiate with UE 1502 directly.

In some implementations, PCell 1504 belongs to a MeNB (Master eNB) controlled by a MCG (Master Cell Group). The MCG may include a group of cells (e.g., component carriers) and UE 1502 communicates with one PCell in the MCG. The RAN profile indexing in CA of FIG. 9A and FIG. 9B can be implemented in the MCG. In some implementations, PsCell 1506 belongs to a SeNB (Secondary eNB) controlled by a SCG (Secondary Cell Group). The SCG may include a group of cells and the UE communicates with one PsCell in the SCG. The RAN profile indexing in CA of FIG. 9A and FIG. 9B can be implemented in the SCG.

Moreover, the MCG and the SCG may be implemented on different RAT. In some implementations, the MCG is implemented on LTE advanced. In some implementations, the MCG is implemented on LTE-Advanced Pro. In some implementations, the SCG is implemented on NR. In some implementations, the MCG is implemented on NR. In some implementations, the SCG is implemented on LTE Advanced, and in more implementations, the SCG is implemented on LTE-Advanced Pro. More specifically, either MCG or SCG implemented on LTE/LTE-Advanced Pro, a default RAN profile (e.g., default BWP configuration) is applied.

Figure 16A:
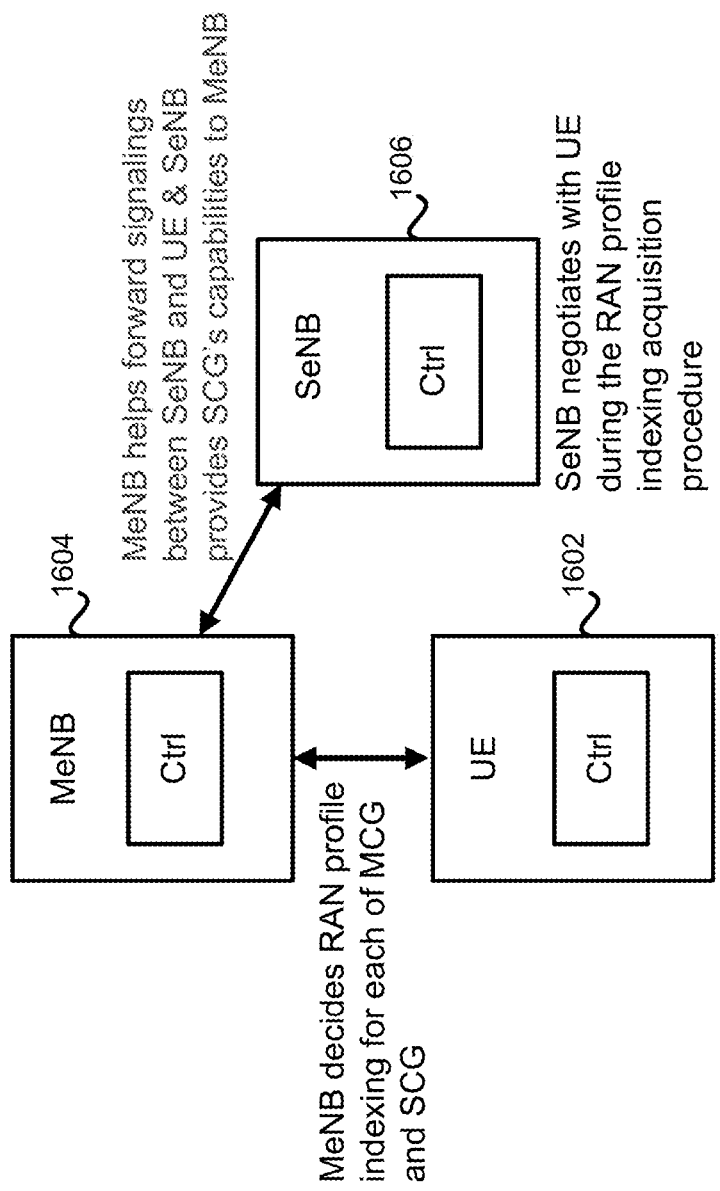
FIG. 16A is a schematic diagram illustrating RAN profile indexing acquisition in dual-connectivity, in accordance with an exemplary implementation of the present application.

FIG. 16A is a schematic diagram illustrating RAN profile indexing acquisition in dual-connectivity, in accordance with an exemplary implementation of the present application. As shown in FIG. 16A, in the present implementation, MeNB 1604 may provide the RAN profile indices (e.g., BWP indices), PHY compositions (e.g., BWP configurations), and software/hardware/backhaul/front-haul capabilities of MCG, and SCG provided by SeNB 1606, since SeNB 1606 may not negotiate with UE 1602 directly. Then, MeNB 1604 may deliver RAN profile indexing message, covering both MCG and SCG in RAN profile indexing acquisition procedure. More specifically, when bearer splitting is configured (e.g., for dual connectivity), a common RAN profile indexing may be required to support the packet transmission/reception between UE 1602 and MeNB 1604/ SeNB 1606. Moreover, in some implementations, the RAN profile indexing would be modified once the combination of MCG or/and SCG is changed.

In another implementation, MeNB 1604/SeNB 1606 may decide the RAN profile indexing of MCG/SCG in response to the capability of MCG/SCG respectively. Moreover, MeNB 1604 may negotiate with UE 1602 directly during the RAN profile indexing acquisition process. MeNB 1604 may help relay the signaling between SeNB 1606 and UE 1602 during the RAN profile indexing acquisition procedure. MeNB 1604 may signal RAN profile indexing, for example, one for MCG and another for SCG to UE 1602. Moreover, SeNB 1606 may still decide the RAN profile indexing of SCG. Therefore, the RAN profile indexing of MCG and SCG are respectively provided via the signaling of MeNB 1604. Thus, the RAN profile indexing of SCG may be changed once the combination of SCG is changed. Since MeNB 1604 dominantly negotiates with UE 1602, the RAN profile indexing of both MCG and SCG may become invalid once MeNB 1604 is changed. In some implementations, MeNB 1604 and SeNB 1606 may need to negotiate with each other for deciding the RAN profile indexing of MCG and SCG, when bearer splitting is applied.

Figure 16B:
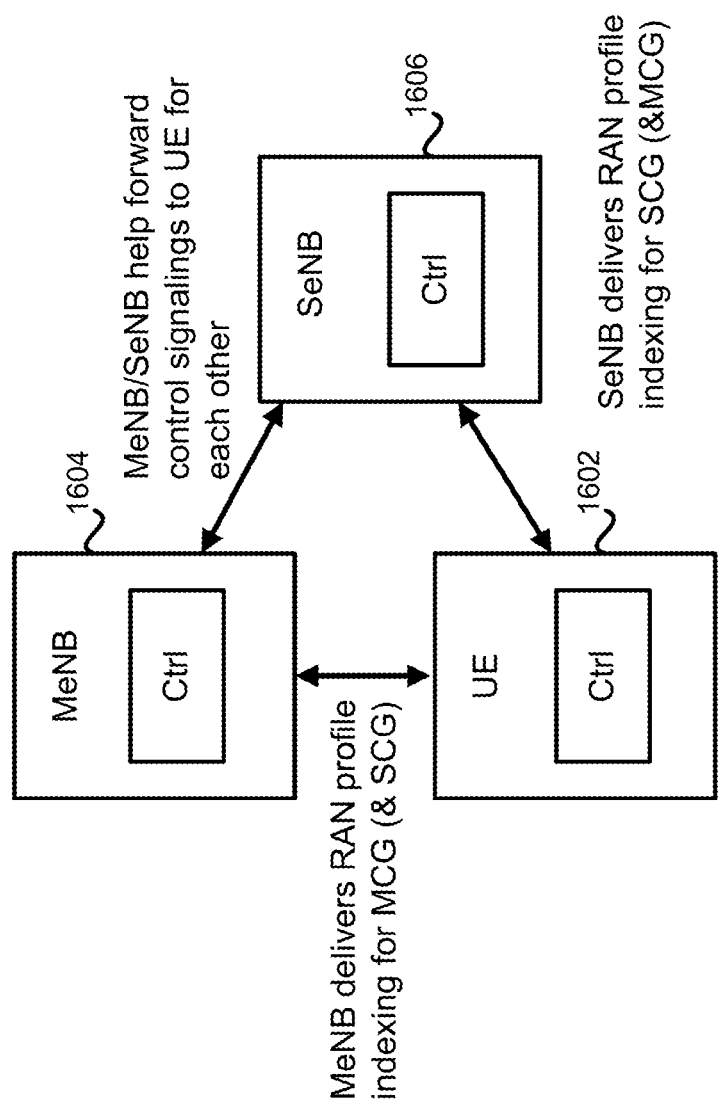
FIG. 16B is a diagram illustrating RAN profile indexing acquisition in dual-connectivity, in accordance with an exemplary implementation of the present application.

FIG. 16B is a diagram illustrating RAN profile indexing acquisition in dual-connectivity, in accordance with an exemplary implementation of the present application. As shown in FIG. 16B, MeNB 1604 and SeNB 1606 may individually/separately negotiate with UE 1602 during the RAN profile indexing acquisition procedure. Therefore, MeNB 1604/SeNB 1606 may respectively decide the RAN profile indexing of MCG/SCG in response to the capability of MCG/SCG. Furthermore, MeNB 1604 and/or SeNB 1606 may build an air link connection to negotiate with UE 1602. As such, the diversity in downlink control signaling (e.g. RRC diversity) among UE 1602, MeNB 1604 and SeNB 1606 can be achieved. In some implementations, SeNB 1606 may help MeNB 1604 relay control signaling to UE 1602 and vice versa during the RAN profile indexing acquisition procedure. In some implementations, MeNB 1604 and SeNB 1606 may respectively negotiate with UE 1602. UE 1602 may then realize two independent RAN profile indexing acquisition procedures which respectively provided by MeNB 1604 and SeNB 1606. In some implementations, MeNB 1604 and SeNB 1606 may need to negotiate with each other for deciding the RAN profile indexing of MCG and SCG under bearer splitting.

Moreover, in some implementations, a UE is required to transmit a confirm signaling after acquiring the RAN profile indexing from a cell. However, when the UE is at RRC idle state, RRC inactive state, light connected RRC connected state, light connected RRC idle state, the UE is not required to send the confirm signaling, e.g. the cell shall ensure the RAN profile indexing applied for these RRC states are feasible to all of the UEs in these RRC states. In unicast RAN profile indexing signaling implementation, when the UE receives the RAN profile indexing signaling, the UE may respond a confirm message including a list of un-supporting RAN profile(s) to the cell. In some other implementations, the UE 1602 may send a failure message to the Cell if the UE does not support at least part of the PHY composition of one RAN profile.

In the present implementation, in carrier aggregation, a PCell negotiates with a UE during the RAN profile indexing acquisition procedure. Therefore, the UE sends the confirm message to the PCell.

In the present implementation, in dual-connectivity, the UE sends the confirm message to a MeNB directly. The UE needs to respectively create two confirm messages for the RAN profile indexing of MCG and SCG. Then, the UE would multiplex the two confirm messages on a UL signaling to the MeNB. The MeNB may then de-multiplex the confirm messages and forward the confirm message of SCG RAN profile indexing to the SeNB. In some other implementations, the UE would respectively transmit the confirm messages for MCG RAN profile indexing and SCG RAN profile indexing to the MeNB and the SeNB. In some implementations, the UE may multiplex two of the confirm messages on a UL signaling to the SeNB. The SeNB may de-multiplex the confirm messages and then forward the confirm message of MCG RAN profile indexing to the MeNB if the SeNB could help to forward control sigalings for the MeNB. The UE replies capability of RAN profile indexing after the UE sends confirm messages for RAN profile indexing.

In broadcast RAN profile indexing signaling implementation, during RRC connection establishment, a UE may acquire RAN profile indexing and reply the capability of RAN profile indexing in UE capability negotiation. For example, an RAN profile indexing confirm Information Element (IE) indicating the invalidation of a RAN profile indexing is included in UECapabilityInformation message. In the present implementation, a cell would not reconfigure the RAN profile indexing after receiving the confirm signaling from a UE. Moreover, for a UE that does not support the RAN profile (e.g., BWP configuration), the cell will keep the information and the cell will not take the specific RAN profile into scheduling account for the UE. Furthermore, in some implementations, if a UE does not support the PHY composition (e.g., BWP configuration) in the broadcasted RAN profile indexing, the cell then serves the UE by a default PHY composition (e.g., default BWP configuration). In some implementation, if a UE does not support the PHY composition in the broadcasted RAN profile indexing, the cell simply treats the UE as a legacy UE. The UE replies capability of RAN profile indexing after the UE sends confirm messages for RAN profile indexing.

Moreover, a cell may reconfigure the RAN profile (e.g., BWP configuration) indexing in the following cases:

(1) Add a new RAN profile;
(2) Delete a previous RAN profile;
(3) Modify the PHY composition of one specific RAN profile;
(4) Cancel all existing RAN profile(s).

In some implementations, for RAN profile indexing reconfiguration, as shown in Table 2, the cell can transmit a RRC signaling (e.g. RRCConnectionReconfiguraiton message) with an Action field for specifying changes being implemented. In some implementations, for RAN profile indexing reconfiguration, the cell can transmit a specific system information with the Action field for specifying changes being implemented.

TABLE 2

RAN profile indexing change indication in RRC signaling

| Bits | Action |
| --- | --- |
| 00 | Add |
| 01 | Delete |
| 10 | Modify |
| 11 | Cancel |

After the UE reading the Action field, the UE would perform an action of RAN profile indexing in response to the Action field. For example, when the UE reads the Action field including bits of "10", the cell will indicate the RAN profile index (e.g. BWP index) with delta information, representing the modified composition, the format shown in FIG. 6 may be applied. Moreover, when a new bitmap of the Action field is created, the format shown in FIG. 7 may be applied.

In some implementations, for RAN profile indexing reconfiguration, the cell uses respective downlink control messages (e.g. RRC signaling, such as ProfileAdd/ProfileDelete/ProfileModify/ProfileCancel) for different purposes. Moreover, in some implementations, the cell includes a PCell in the carrier aggregation. In other implementations, the cell may be replaced with a MeNB/a SeNB in the dual-connectivity. Furthermore, the UE may send a confirm message to inform the supporting of RAN profile indexing changes.

Figure 17:
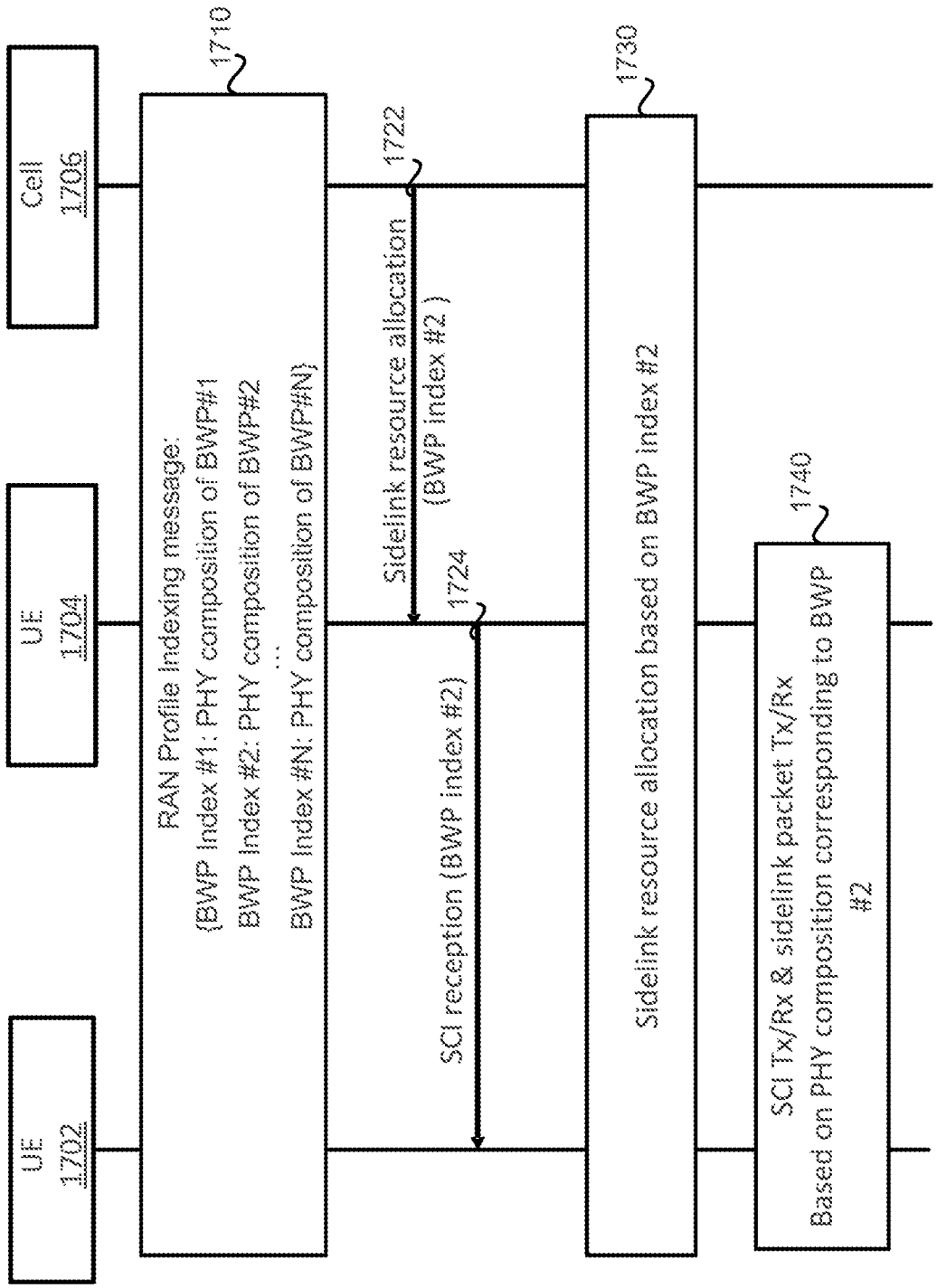
FIG. 17 is a diagram illustrating a RAN profile index provision for a sidelink mechanism, in accordance with an exemplary implementation of the present application.

FIG. 17 is a diagram illustrating a RAN profile index provision for a sidelink mechanism, in accordance with an exemplary implementation of the present application. In action 1710, UE 1702 and UE 1704 are configured with RAN profile indexing with cell 1706. In action 1722, cell 1706 may provide a sidelink resource allocation message to 1704 (e.g. through an RRC signaling) to transmit at least one sidelink packet to UE 1702. Cell 1706 may allocate at least one RB in the sidelink resource allocation message, for cell 1706 to deliver the at least one sidelink packet to UE 1702. In the present implementation, the BWP index for decoding the RB (e.g., BWP index #2) may be included in the sidelink resource allocation message provided by cell 1706 in action 1722.

In some implementations, cell 1706 allocates an RB for UE 1704 to deliver Sidelink Control Information (SCI) to UE 1702. In action 1724, UE 1704 may deliver the resource allocation and BWP index of the at least one sidelink packet in the SCI. In action 1730, UE 1702 decodes the SCI, in response to the RAN profile indexing to obtain sidelink resource allocation based on the BWP index (BWP index #2), for obtaining the at least one sidelink (SL) packet. In one implementation, UE 1704 may deliver the SCI based on a default BWP index, when cell 1706 does not indicate the BWP index of the SCI to UE 1702 and UE 1704. In action 1740, UE 1702 may decode the SL packet based on the BWP index for decoding the RB (e.g., using BWP #2) for obtaining the at least one SL packet.

Figure 18:
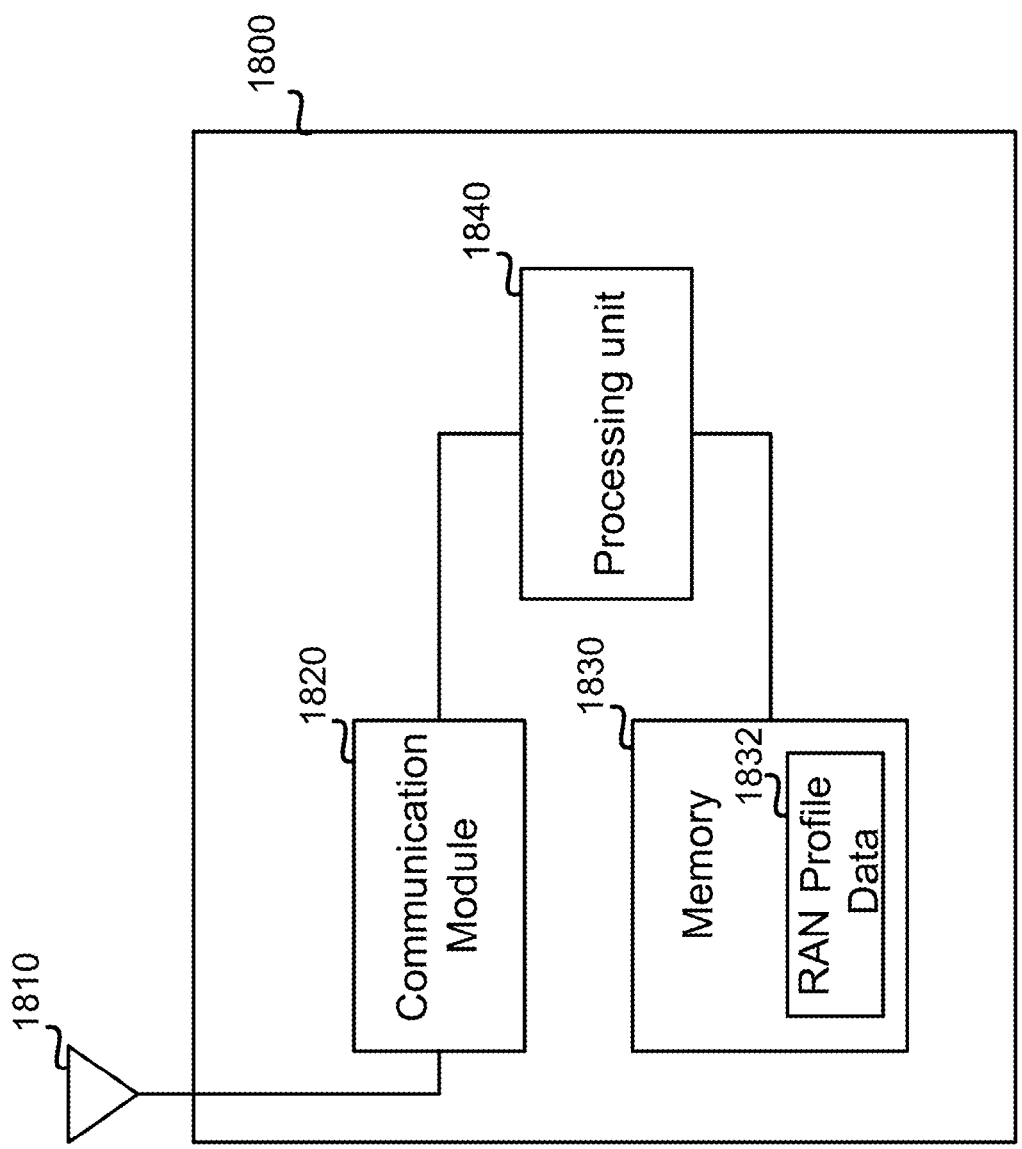
FIG. 18 is a block diagram illustrating a radio communication equipment for a cell, in accordance with an exemplary implementation of the present application.

FIG. 18 is a block diagram illustrating a radio communication equipment for a cell, in accordance with an exemplary implementation of the present application. The radio communication equipment may be configured to implement the RAN profile indexing methods described with reference to FIGS. 1 through 17 above. In FIG. 18, radio communication equipment 1800 includes antenna module 1810, communication module 1820, memory 1830, and processing unit 1840. Antenna module 1810 is coupled to communication module 1820. Communication module 1820 and memory 1830 are configured to couple to processing unit 1840.

Antenna module 1810 may comprise one or more antennas, and may be configured to perform beamforming omni-transmission with one or more UEs within its serving cell. Communication module 1820 may comprise one or more transmitters and one or more receivers for allowing the cell to perform data transmission and reception with the UEs within its cell coverage using antenna module 1810.

Processing unit 1840 is configured to control the operation of the cell and function as the central processing core for the cell. Memory 1830 is configured to store program instructions for the execution by processing unit 1840. Memory 1830 is further configured to allocate a memory space for storing RAN profile indexing data (e.g., BWP indices) and the corresponding PHY composition settings (e.g., BWP configurations). The program instructions stored upon execution by processing unit 1840, causes the processing unit 1840 to implement one or more the aforementioned methods for signaling RAN profile indexing.

In one implementation, radio communication equipment 1800 may further include a timer (not explicitly shown in FIG. 18). The timer is configured for timing a predefined time interval after that radio communication equipment 1800 signals the RAN profile indexing information to the one or more UEs within its radio coverage using broadcast or unicast transmission. During the predefined time interval, radio communication equipment 1800 may not make any updates to its current RAN profile indexing and PHY compositions.

Additionally, radio communication equipment 1800 may further include other necessary network elements for supporting the network operations of the cell may not be essential to the present application. The details of such elements are hereby omitted for brevity.

What is claimed is:

1. A base station for wireless communication in a wireless communication network, the base station comprising:
   one or more non-transitory computer-readable media having computer-executable instructions embodied thereon; and
   at least one processor coupled to the one or more non-transitory computer-readable media, and configured to execute the computer-executable instructions to:
   transmit, via a first cell operating on a first component carrier, a first radio access network (RAN) profile indexing message to a user equipment (UE), the first RAN profile indexing message comprising a first plurality of Bandwidth Part (BWP) indices corresponding to a first plurality of BWP configurations; and
   transmit, via the first cell on a first resource block (RB) of a default BWP of the first component carrier, a first BWP index of the first plurality of BWP indices to the UE, the first BWP index corresponding to a first BWP configuration of the first plurality of BWP configurations,
   wherein at least one of the first plurality of BWP configurations includes:
   a BWP index associated with the corresponding BWP configuration;
   a frequency location of the corresponding BWP configuration;
   a bandwidth in frequency domain;
   a transmission type; and
   one or more periodic resource allocations associated with the transmission type,
   wherein the first plurality of BWP configurations configures at least a first BWP and a second BWP in the first component carrier in the frequency domain,
   wherein the first BWP comprises a first set of RBs within a first frequency range of the first component carrier and the second BWP comprises a second set of RBs within a second frequency range of the first component carrier,
   wherein numerologies of the first BWP and the second BWP include a cyclic prefix and a subcarrier spacing configuration, and
   wherein the first and second frequency ranges are one of (i) at least partially overlapped in the frequency domain and (ii) not overlapped in the frequency domain.

2. The base station of claim 1, wherein:
   the one or more periodic resource allocations associated with the transmission type includes one or more uplink (UL) grant free resource configurations or a Semi-Persistent-Scheduling (SPS) configuration, and
   the at least one of the first plurality of BWP configurations further includes at least one of:
   a Control-Resource Set (CORESET) configuration; and
   a default BWP indication having an applicable radio resource control (RRC) state.

3. The base station of claim 1, wherein the at least one processor is further configured to execute the computer-executable instructions to:
   transmit, via the first cell on the first RB as part of a first downlink control information (DCI) message, a BWP indicator field (BIF) to indicate the first BWP configuration; and
   transmit, via the first cell, a plurality of second DCI messages,
   wherein the plurality of second DCI messages is encoded based on a Control-Resource Set (CORESET) configuration of the first BWP configuration.

4. The base station of claim 3, wherein the plurality of second DCI messages indicates a first plurality of RB allocations to indicate a first plurality of data RBs for the UE to transmit and/or receive data on the first component carrier, wherein the first plurality of data RBs is encoded based on the first BWP configuration corresponding to the first BWP index.

5. The base station of claim 3, wherein the plurality of second DCI messages comprises:
   a first Semi-Persistent-Scheduling (SPS) activation message, having a first SPS RB allocation, to activate a first SPS configuration, which is provided in the first BWP configuration, wherein the first SPS configuration is in a downlink, uplink, or sidelink direction, wherein the downlink, uplink, or sidelink direction of the first SPS RB allocation is decided by the first SPS configuration; and
   a first SPS de-activation message for de-activating the first SPS configuration after the first SPS configuration is activated by the first SPS activation message.

6. The base station of claim 3, wherein the at least one processor is further configured to execute the computer-executable instructions to:
   receive at least a first UL grant free packet on a first UL grant free resource after the UE decodes the first DCI message, wherein the first UL grant free resource is configured in the first BWP configuration.

7. The base station of claim 1, wherein the at least one processor is further configured to execute the computer-executable instructions to:
   transmit, via a second cell on a second RB of a second component carrier as part of a first downlink control information (DCI) message, a second BWP index of the first plurality of BWP indices to the UE, wherein the second BWP index corresponds to a second BWP configuration in a second plurality of BWP configurations for the second component carrier, wherein the second plurality of BWP configurations is part of the first plurality of BWP configurations, and
   wherein the UE decodes, on the second component carrier, the first DCI message to obtain the second BWP index and identify a corresponding one of the second plurality of BWP configurations.

8. The base station of claim 7, wherein the at least one processor is further configured to execute the computer-executable instructions to:
transmit, via the second cell, a plurality of second DCI messages to the UE, wherein the plurality of second DCI messages indicates a first plurality of RB allocations to indicate a first plurality of data RBs for the UE to transmit and/or receive data on the second component carrier, and the plurality of second DCI messages is encoded based on a Control-Resource Set (CORESET) configuration of the second BWP configuration, and
wherein the UE decodes the plurality of second DCI messages based on the CORESET configuration of the second BWP configuration, and transmits or receives packets based on the plurality of second DCI messages and the first plurality of RB allocations.

9. The base station of claim 8, wherein the plurality of second DCI messages further comprises:
a first Semi-Persistent-Scheduling (SPS) activation message, having a first SPS RB allocation, to activate a first SPS configuration, which is provided in the second BWP configuration, wherein the first SPS configuration is in a downlink, uplink, or sidelink direction, wherein the downlink, uplink, or sidelink direction of the first SPS RB allocation is decided by the first SPS configuration; and
a first SPS de-activation message for de-activating the first SPS configuration after the first SPS configuration is activated by the first SPS activation message.

10. The base station of claim 1, wherein the at least one processor is further configured to execute the computer-executable instructions to:
transmit the first RAN profile indexing message to one or more other base stations that operate one or more secondary cells via at least one backhaul connection.

11. A method performed by a base station, the method comprising:
transmitting, via a first cell operating on a first component carrier, a first radio access network (RAN) profile indexing message to a user equipment (UE), the first RAN profile indexing message comprising a first plurality of Bandwidth Part (BWP) indices corresponding to a first plurality of BWP configurations; and
transmitting, via the first cell on a first resource block (RB) of a default BWP of the first component carrier, a first BWP index of the first plurality of BWP indices to the UE, the first BWP index corresponding to a first BWP configuration of the first plurality of BWP configurations,
wherein at least one of the first plurality of BWP configurations includes:
a BWP index associated with the corresponding BWP configuration;
a frequency location of the corresponding BWP configuration;
a bandwidth in frequency domain;
a transmission type; and
one or more periodic resource allocations associated with the transmission type,
wherein the first plurality of BWP configurations configures at least a first BWP and a second BWP in the first component carrier in the frequency domain,
wherein the first BWP comprises a first set of RBs within a first frequency range of the first component carrier and the second BWP comprises a second set of RBs within a second frequency range of the first component carrier,
wherein numerologies of the first BWP and the second BWP include a cyclic prefix and a subcarrier spacing configuration, and
wherein the first and second frequency ranges are one of (i) at least partially overlapped in the frequency domain and (ii) not overlapped in the frequency domain.

12. The method of claim 11, wherein:
the one or more periodic resource allocations associated with the transmission type includes one or more uplink (UL) grant free resource configurations or a Semi-Persistent-Scheduling (SPS) configuration, and
the at least one of the first plurality of BWP configurations further includes at least one of:
a Control-Resource Set (CORESET) configuration; and
a default BWP indication having an applicable radio resource control (RRC) state.

13. The method of claim 11, further comprising:
transmitting, via the first cell on the first RB as part of a first downlink control information (DCI) message, a BWP indicator field (BIF) to indicate the first BWP configuration; and
transmitting, via the first cell, a plurality of second DCI messages,
wherein the plurality of second DCI messages is encoded based on a Control-Resource Set (CORESET) configuration of the first BWP configuration.

14. The method of claim 13, wherein the plurality of second DCI messages indicates a first plurality of RB allocations to indicate a first plurality of data RBs for the UE to transmit and/or receive data on the first component carrier, wherein the first plurality of data RBs is encoded based on the first BWP configuration corresponding to the first BWP index.

15. The method of claim 13, wherein the plurality of second DCI messages comprises:
a first Semi-Persistent-Scheduling (SPS) activation message, having a first SPS RB allocation, to activate a first SPS configuration, which is provided in the first BWP configuration, wherein the first SPS configuration is in a downlink, uplink, or sidelink direction, wherein the downlink, uplink, or sidelink direction of the first SPS RB allocation is decided by the first SPS configuration; and
a first SPS de-activation message for de-activating the first SPS configuration after the first SPS configuration is activated by the first SPS activation message.

16. The method of claim 13, further comprising:
receiving at least a first UL grant free packet on a first UL grant free resource after the UE decodes the first DCI message, wherein the first UL grant free resource is configured in the first BWP configuration.

17. The method of claim 13, further comprising:
transmitting, via a second cell on a second RB of a second component carrier as part of a first downlink control information (DCI) message, a second BWP index of the first plurality of BWP indices to the UE, wherein the second BWP index corresponds to a second BWP configuration in a second plurality of BWP configurations for the second component carrier, wherein the second plurality of BWP configurations is part of the first plurality of BWP configurations, and
wherein the UE decodes, on the second component carrier, the first DCI message to obtain the second BWP index and identify a corresponding one of the second plurality of BWP configurations.

18. The method of claim 17, further comprising:

transmitting, via the second cell, a plurality of second DCI messages to the UE, wherein the plurality of second DCI messages indicates a first plurality of RB allocations to indicate a first plurality of data RBs for the UE to transmit and/or receive data on the second component carrier, and the plurality of second DCI messages is encoded based on a Control-Resource Set (CORESET) configuration of the second BWP configuration, and wherein the UE decodes the plurality of second DCI messages based on the CORESET configuration of the second BWP configuration, and transmits or receives packets based on the plurality of second DCI messages and the first plurality of RB allocations.

19. The method of claim 18, wherein the plurality of second DCI messages further comprises:

a first Semi-Persistent-Scheduling (SPS) activation message, having a first SPS RB allocation, to activate a first SPS configuration, which is provided in the second BWP configuration, wherein the first SPS configuration is in a downlink, uplink, or sidelink direction, wherein the downlink, uplink, or sidelink direction of the first SPS RB allocation is decided by the first SPS configuration; and a first SPS de-activation message for de-activating the first SPS configuration after the first SPS configuration is activated by the first SPS activation message.

20. The method of claim 11, further comprising:

transmitting the first RAN profile indexing message to one or more other base stations that operate one or more secondary cells via at least one backhaul connection.

\* \* \* \* \*